(12) United States Patent
Sanada et al.

(10) Patent No.: US 11,993,099 B2
(45) Date of Patent: May 28, 2024

(54) BALLPOINT PEN

(71) Applicant: KABUSHIKI KAISHA PILOT CORPORATION, Tokyo (JP)

(72) Inventors: Yusuke Sanada, Tokyo (JP); Hidenori Kudou, Tokyo (JP); Takeshi Fujii, Tokyo (JP)

(73) Assignee: KABUSHIKI KAISHA PILOT CORPORATION, Tokyo (JP)

( * ) Notice: Subject to any disclaimer, the term of this patent is extended or adjusted under 35 U.S.C. 154(b) by 0 days.

(21) Appl. No.: 18/023,265

(22) PCT Filed: Aug. 27, 2021

(86) PCT No.: PCT/JP2021/031609
§ 371 (c)(1),
(2) Date: Feb. 24, 2023

(87) PCT Pub. No.: WO2022/045313
PCT Pub. Date: Mar. 3, 2022

(65) Prior Publication Data
US 2023/0322010 A1    Oct. 12, 2023

(30) Foreign Application Priority Data

Aug. 31, 2020 (JP) ................................. 2020-145897
Aug. 31, 2020 (JP) ................................. 2020-145899

(51) Int. Cl.
*C09D 11/18* (2006.01)
*B43K 7/02* (2006.01)
(Continued)

(52) U.S. Cl.
CPC ................. *B43K 7/10* (2013.01); *B43K 7/02* (2013.01); *C09D 11/18* (2013.01); *B43K 7/12* (2013.01)

(58) Field of Classification Search
CPC ... B43K 7/10; B43K 7/02; B43K 7/12; B43K 7/00; B43K 7/005; B43K 7/01; B43K 7/08; C09D 11/18; C09D 11/16
(Continued)

(56) References Cited

U.S. PATENT DOCUMENTS

2015/0023720 A1* 1/2015 Fujii ..................... B43K 1/082
401/209
2015/0298488 A1* 10/2015 Masuda ............. C23C 16/0272
401/209

FOREIGN PATENT DOCUMENTS

EP        0736396 A1    10/1996
JP        H05-331403 A  12/1993
(Continued)

OTHER PUBLICATIONS

International Search Report issued in corresponding International Patent Application No. PCT/JP2021/031609, filed Oct. 26, 2021, with English translation.

*Primary Examiner* — David J Walczak
(74) *Attorney, Agent, or Firm* — Rimon P.C.

(57) ABSTRACT

A ballpoint pen. In the ballpoint pen, an oil-based ballpoint pen ink composition has an ink viscosity with a range of 500 mPa·s to 15000 mPa·s inclusive at 20° C. and a shear rate of 500 sec$^{-1}$. A ball has a ball diameter of 0.5 mm or less. A tip distal end portion includes a first swaged portion and a second swaged portion. The first swaged portion has an inclination angle with a range of 90 degrees to 100 degrees inclusive. The second swaged portion is provided closer to a distal end side of a ballpoint pen tip than the first swaged portion and has an inclination angle with a range of 110 degrees to 130 degrees inclusive. An angle of a bottom wall of a ball holding chamber is the same as the inclination angle of the second swaged portion.

7 Claims, 2 Drawing Sheets

(51) Int. Cl.
*B43K 7/10* (2006.01)
*B43K 7/12* (2006.01)

(58) Field of Classification Search
USPC .......................................... 401/208, 209, 216
See application file for complete search history.

(56) References Cited

FOREIGN PATENT DOCUMENTS

| | | | |
|---|---|---|---|
| JP | H06-015218 | A | 1/1994 |
| JP | H07-196971 | A | 8/1995 |
| JP | H09-108606 | A | 4/1997 |
| JP | 2003-341274 | A | 12/2003 |
| JP | 3500552 | B2 | 2/2004 |
| JP | 2007-176995 | A | 7/2007 |
| JP | 2010-184495 | A | 8/2010 |
| JP | 2017-088889 | A | 5/2017 |
| JP | 2018-176636 | A | 11/2018 |
| JP | 2019-089991 | A | 6/2019 |

* cited by examiner

BALLPOINT PEN

CROSS-REFERENCE OF RELATED APPLICATIONS

This application is the U.S. National Phase under 35 U.S.C. § 371 of International Patent Application No. PCT/JP2021/031609, filed on Aug. 27, 2021, which in turn claims the benefit of Japanese Patent Application No. 2020-145897, filed on Aug. 31, 2020, and Japanese Patent Application No. 2020-145899, filed on Aug. 31, 2020, the entire disclosures of which Applications are incorporated by reference herein.

TECHNICAL FIELD

The present invention relates to a ballpoint pen.

BACKGROUND ART

There have been conventionally known ballpoint pens each including a ballpoint pen tip. The ballpoint pen tip includes: for example, an ink distribution hole formed at the center of the bottom wall of the ball holding chamber; and a plurality of ink distribution channels radially extending from the ink distribution hole. There is known a ballpoint pen tip where a ball is placed on a ball socket, which has an approximately circular-arc surface, provided on the bottom wall of a ball holding chamber, and a tip distal end portion is swaged inward whereby the ball is held in a manner that the ball is allowed to rotate while partially protruding from the tip distal end edge.

The writing instruments tend to have an influence on the writing tastes of ballpoint pens, marking pens, and the like through the writing resistance between the ballpoint pen tip and the writing surface while writing. The ballpoint pen especially has a ballpoint pen tip that includes: a tip main body made of a metal such as stainless steel, at its distal end; and a hall made of a metal such as super steel, held on a hall socket in the tip main body made of the metal. The ballpoint pen thus has a problem in which the hall socket is worn down due to the rotation of the ball while writing, resulting in skipping in line, blur and the like in handwriting, and poor writing taste. Moreover, in a case where the ball diameter is reduced to 0.5 mm or less, in particular, a paper contact phenomenon in which the ball gets into the paper surface due to the writing pressure and the outer surface of the swaged portion abuts on the writing surface is likely to occur, consequently the smoothness while writing has been prone to be poor.

In order to improve the smoothness while writing, which is important for the ballpoint pen, the thickness of the swaged portion is reduced or the angle of the swaged portion is made smaller. Specifically, the closer the angle of the swaged portion is to the angle of the tapered surface having a smaller diameter from the large-diameter portion toward the tip distal end direction, the less likely the paper contact to occur. For example, there has been disclosed a technique in which since the angle of the tapered surface is often about 30 degrees, the angle of the swaged portion is made to be 90 degrees or less such that the paper contact is less likely to occur, (See, for example, Patent Document 1). However, when the thickness of the swaged portion is reduced or the inclination angle (swaging angle) is made smaller, the durability of the ballpoint pen tip is deteriorated due to that the ball tends to fall out from the ball holding chamber and the like.

It is conceivable to increase the thickness of the swaged portion in order to improve the durability of the ballpoint pen tip. However, this results in a poor smoothness while writing due to that the swaged portion is more likely to come into contact with the writing surface and the like. That is, when the smoothness is improved, the durability decreases, and conversely, when the durability is improved, the smoothness becomes poor.

Incidentally, there has been a disclosure in which a sealing surface having an approximately circular-arc surface is formed on the inner wall of the tip distal end portion in a ballpoint pen tip, in order to prevent ink leakage from the tip distal end portion (See, for example, Patent Document 2). However, the thickness at the swaged portion becomes smaller, and thus the durability of the tip tends to decrease.

CITATION LIST

Patent Literature

Patent Document 1: JP H06-15218 A
Patent Document 2: JP 2010-184495 A

SUMMARY OF INVENTION

Problems to be Solved by Invention

In particular, in the case of using a ballpoint pen having a small-diameter ball with a ball diameter of 0.5 mm or less, when writing the same distance, the smaller the diameter of the ball, the larger the number of rotations of the ball. In addition, when the small-diameter ball is used, a larger load is applied to the ball socket, consequently the ball socket is severely worn down, which results in writing failure. For this reason, when a small-diameter ball is used, a new problem is likely to occur.

An object of the present invention is to provide a ballpoint pen having a small-diameter ball with a ball diameter of 0.5 mm or less, which allows stable ball rotation and stable ink outflow.

Means for Solving Problem

A ballpoint pen of the present invention includes a ballpoint pen refill, the ballpoint pen refill including an ink reservoir cylinder and a ballpoint pen tip, an inside of the ink reservoir cylinder being filled with an oil-based ballpoint pen ink composition, the ballpoint pen tip being attached to a distal end portion of the ink reservoir cylinder, wherein a tip main body of the ballpoint pen tip includes: a ball holding chamber that holds a ball in a manner of allowing the ball to rotate while causing a part of the ball to protrude from a tip distal end portion; a ball socket provided on a bottom wall of the ball holding chamber, the ball being placed on the ball socket, the ball socket having a circular-arc surface conforming to an outer shape of the ball; an ink distribution hole firmed in a center of the bottom wall of the ball holding chamber; and a plurality of ink distribution channels radially extending from the ink distribution hole, the oil-based ballpoint pen ink composition has an ink viscosity with a range of 500 mPa·s to 15000 mPa·s inclusive at 20° C. and a shear rate of 500 sec', the ball has a ball diameter of 0.5 mm or less, a sealing surface with a circular-arc shape is formed on an inner wall of the tip distal end portion, the tip distal end portion includes a first swaged portion having an inclination angle with a range of 90 degrees to 100 degrees inclusive, and a second swaged portion provided closer to the distal end side of the ballpoint pen tip than the first swaged portion, the second swaged portion having an inclination angle with a range of 110 degrees to 130 degrees inclusive, and an angle of the bottom wall of the ball holding chamber is the same as the inclination angle of the second swaged portion.

The ballpoint pen further includes a coil spring that presses the ball toward the distal end side of the tip distal end portion wherein a pressing load of the coil spring is in a range of 5 gf to 10 gf inclusive.

The oil-based ballpoint pen ink composition contains a colorant, an organic solvent, a saturated fatty acid, and a phosphoric acid ester, the phosphoric acid ester having $C_lH_{2l+1}O—C_2H_4O$ or $C_mH_{2m+1}O$ (1, m=1 to 30 inclusive).

The number of carbon atoms of the saturated fatty acid is in a range of 10 to 20 inclusive.

Carbon chains (1, m) of a terminal alkyl group of the phosphoric acid ester are in a range of 1 to 15 inclusive.

The oil-based ballpoint pen ink composition contains a ketone resin or a polyvinyl butyral resin.

The colorant is a pigment or a salt-forming dye.

Effect of Invention

According to the present invention, there has been achieved a ballpoint pen having a small-diameter ball with a ball diameter of 0.5 mm or less, which allows stable ball rotation and stable ink outflow.

DESCRIPTION OF EMBODIMENTS

In the present specification, "part", "%", "ratio" and the like indicating the blending are on a mass basis unless otherwise specified. In the present invention, the term "distal" indicates a position closer to the ballpoint pen tip in the case of the ballpoint pen, and indicates a position closer to the ball in the case of the ballpoint pen tip.

(Ballpoint Pen)

Figure 1:
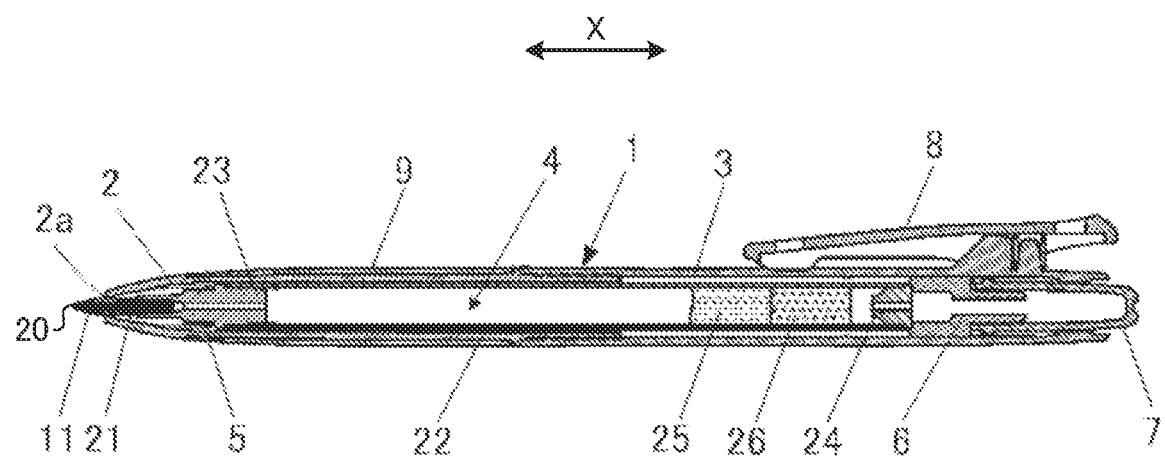
FIG. 1 is a cross-sectional view illustrating an example of a ballpoint pen of the present embodiment.

FIG. 1 is a cross-sectional view illustrating an example of a ballpoint pen 1 of the present embodiment.

The ballpoint pen 1 of the present embodiment includes a ballpoint pen refill 4. The ballpoint pen refill 4 is a replacement of ink reservoir for the ballpoint pen 1.

The ballpoint pen refill 4 is accommodated in an outer cylinder main body in which a front shaft 2 and a rear shaft 3 of the ballpoint pen 1 are detachably screwed. The ballpoint pen refill 4 is housed with being biased rearward by a coil spring 5.

Note that, the terms "rear" and "rear end portion" mean a direction toward one end portion in an extending direction X of the ballpoint pen 1, where a ball 20 is not provided in the extending direction X, and an end portion in this direction. In contrast, the terms "front", "distal end side", "front end portion" and "distal end portion" mean a direction toward one end portion in the extending direction X of the ballpoint pen 1, where the ball 20 is provided in the extending direction X, and an end portion in this direction.

Figure 2:
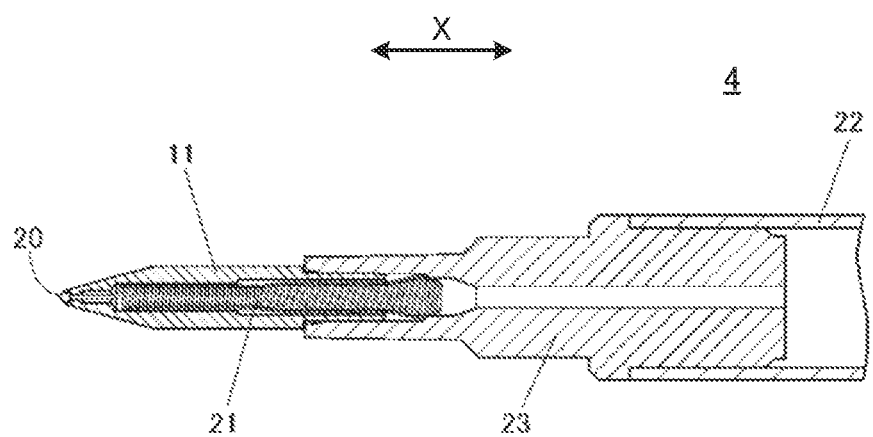
FIG. 2 is a cross-sectional view illustrating an example of a ballpoint pen refill of the present embodiment.

FIG. 2 is a cross-sectional view of an example of the ballpoint pen refill 4 of the present embodiment. FIG. 2 illustrates a main part where a part of the configuration of the ballpoint pen refill 4 is omitted.

The ballpoint pen refill 4 includes an ink reservoir cylinder 22 and a ballpoint pen tip 11.

The ink reservoir cylinder 22 has a tubular shape elongated in the extending direction X. The extending directions X of the ink reservoir cylinder 22 and that of the ballpoint pen 1 coincide with each other. The inside of the ink reservoir cylinder 22 is filled with an oil-based ballpoint pen ink composition 25 and is provided with an ink follower 26 following the oil-based ballpoint pen ink composition 25. The rear end portion of the ink reservoir cylinder 22 is equipped with a tail plug 24 (see FIG. 1).

The ballpoint pen tip 11 is provided at one end (distal end portion) in the extending direction X of the ink reservoir cylinder 22. The extending direction X of the ink reservoir cylinder 22 coincides with the extending direction X of the ballpoint pen 1. Hereinafter, there may be a case where the extending direction X is referred to as an axial direction. That is, the extending direction X is a direction along a straight line (central axis J) passing through the center of the cut surface of the tubular ink reservoir cylinder 22. In other words, the extending direction X is a direction along the central axis J of the tubular ink reservoir cylinder 22.

The ballpoint pen tip 11 is a member that holds the ball 20 in a manner of allowing the ball 20 to rotate. That is, the ballpoint pen tip 11 holds the ball 20 at the distal end portion which is one end portion in the extending direction X of the ink reservoir cylinder 22. The ball 20 is a spherical member with a ball diameter of 0.5 mm or less. The ball diameter of the ball 20 needs to be more than 0.1 mm and 0.5 mm or less.

Specifically, the ballpoint pen tip 11 is attached to the distal end portion of the ink reservoir cylinder 22 via a tip holder 23.

Back to FIG. 1, the description will be continued.

In the present embodiment, an embodiment in which the ballpoint pen 1 is a retractable ballpoint pen 1 will be described as an example. Specifically, the ballpoint pen 1 is configured such that the front end portion of the ballpoint pen tip 1 which is the pen nib of the ballpoint pen refill 4, is retractable from a front end opening 2a of the front shaft 2 by clicking a click member 7 through the retractable mechanism with a rotation cam 6. On the rear shaft 3 is disposed, for example, a clip 8. On the grip portion of the front shaft 2 is provided a grip 9 made of, for example, an olefin-based thermoplastic elastomer, or the like.

Specifically, the ballpoint pen 1 is provided with the rotation cam 6 and a cam mechanism (not illustrated) as the retractable mechanism. The rotation cam 6 is provided in the rear shall 3. and changes state of the ballpoint pen tip 11 of the ballpoint pen refill 4 between its appearance and retraction positions. The cam mechanism has a cam groove engaged with the rotation cam 6.

When the click member 7 is clicked in a state where the ballpoint pen tip 11 of the ballpoint pen refill 4 is retracted in the front shaft 2, the rotation cam 6 slides along the cam groove. The click operation for the click member 7 may be referred to as a click operation, By sliding of the rotation cam 6, the ballpoint pen tip 11 of the ballpoint pen refill 4 protrudes forward from an opening 2a of the front shaft 2. Moreover, the rotation cam 6 is rotated by the action of the cam mechanism, thereby restricting the relative movement of the ballpoint pen refill 4 rearward in the axial direction. Thus, this protruding state is maintained even after the completion of the click operation. When the click member 7 is clicked (click operation) again in this protruding state, the relative movement of the ballpoint pen refill 4 rearward in the axial direction is allowed by the action of the cam mechanism. By this relative movement, the biasing force of the coil spring 5 pushes the ballpoint pen refill 4 and the click member 7 rearward in the axial direction, thereby returning into the initial state.

Figure 3:
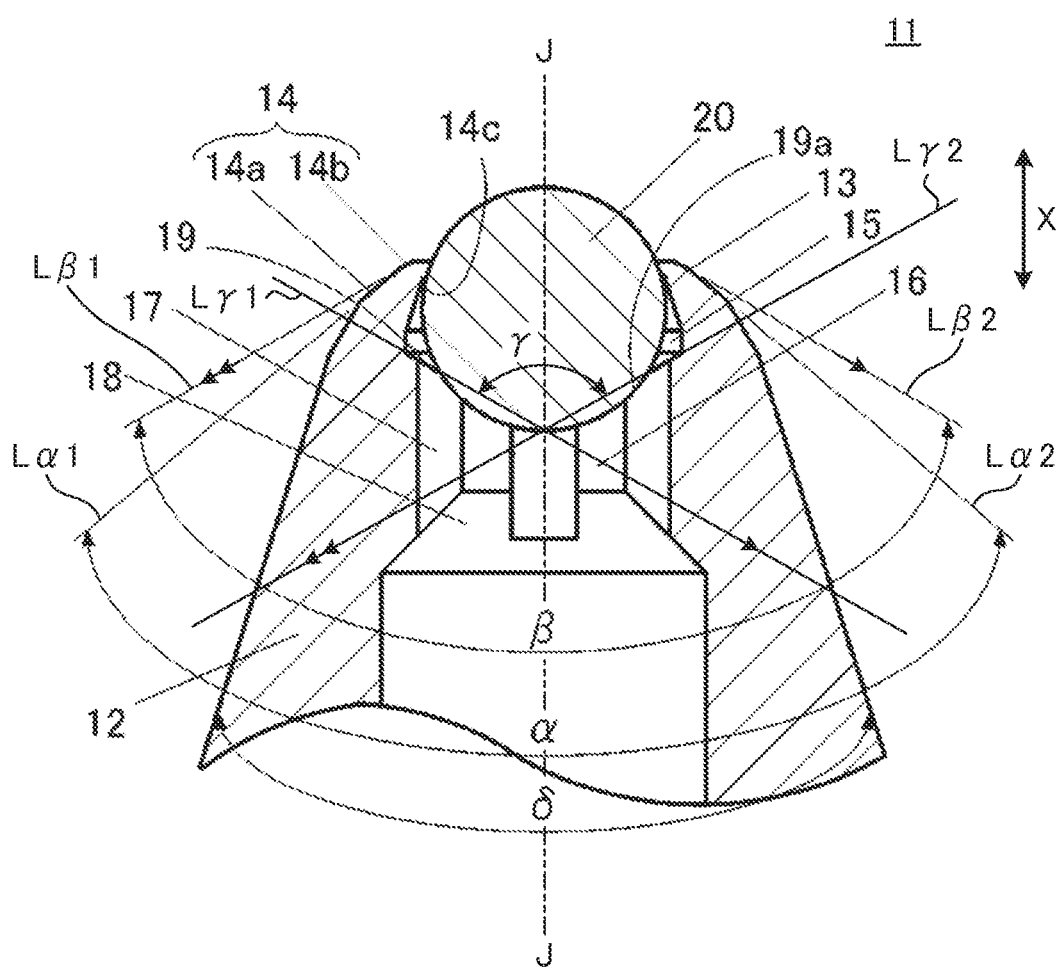
FIG. 3 is an enlarged cross-sectional view illustrating an example of a ballpoint pen tip of the present embodiment.

FIG. 3 is an enlarged cross-sectional view of an example of the ballpoint pen tip 11 of the present embodiment. FIG. 3 illustrates a main part where a part of the configuration of the ballpoint pen tip 11 is omitted.

The ballpoint pen tip 11 includes a tip main body 12. The tip main body 12 is provided with a ball holding chamber 15, an ink distribution hole 16, an ink distribution channel 17, a ball socket 19a, and the like.

The ball holding chamber 15 holds the ball 20 in a manner of allowing the ball to 20 rotate while causing a part of the ball 20 to protrude from a tip distal end portion 13. The ball holding chamber 15 is provided at the distal end portion in the extending direction X of the ink distribution hole 16. At a bottom wall 19 of the ball holding chamber 15 is provided the ball socket 19a having a shape conforming to the outer shape of the ball 20. As described above, the ball 20 is spherical. Therefore, the ball socket 19a has an approximately circular-arc surface. The ball 20 is placed on the ball socket 19a. The bottom wall 19 of the ball holding chamber 15 is a region of the inner wall in the ball holding chamber 15, which is continuous with a sealing surface 14c provided at the tip distal end portion 13, and is closer to the rear side of the ballpoint pen 1 than the sealing surface 14c.

The ink distribution hole 16 is a hole that penetrates in the extending direction X and through Which ink flows. The ink is an oil-based ballpoint pen ink composition. The ink distribution hole 16 is formed at the center of the bottom wall 19 of the ball holding chamber 15. The ink distribution channel 17 is a channel that communicates with the ink distribution hole 16 and radially extends from the ink distribution hole 16, The ballpoint pen tip 11 is provided with a plurality of ink distribution channels 17. These ink distribution channels 17 each are provided so as to communicate with the ink distribution hole 16 and not to communicate with a tip rear hole 18.

The tip distal end portion 13 of the ballpoint pen tip 11 is a swaged portion 14 having a shape swaged inward. The ball 20 is placed on the ball socket 19a of the ball holding chamber 15, and the tip distal end portion 13 has the swaged portion 14, so that the ball holding chamber 15 holds the ball 20 in a manner of allowing the ball 20 to rotate while causing a part of the ball 20 to protrude front the tip distal end portion 13. In addition, a sealing surface 14c having an approximately circular-arc surface, that is, a shape conforming to the outer shape of the ball 20 is formed on the inner wall of the tip distal end portion 13.

As described above, the tip distal end portion 13 of the ballpoint pen tip 11 is the swaged portion 14 having an inward swaged shape. The swaged portion 14 includes a first swaged portion 14a and a second swaged portion 14b.

The first swaged portion 14a has an inclination angle with a range of 90 degrees to 100 degrees exclusive of 100 degrees. The second swaged portion 14b is provided closer to the distal end side of the ballpoint pen tip 11 than the first swaged portion 14a, and has an inclination angle with a range of 110 degrees to 130 degrees inclusive. The inclination angle of the first swaged portion 14a may be referred to as a first inclination angle $\alpha$ in the description. In addition, the inclination angle of the second swaged portion 14b may be referred to as a second inclination angle $\beta$ in the description. These inclination angles each may be referred to as a swaging angle.

As illustrated in FIG. 3, the first inclination angle $\alpha$ is an angle formed by a line L$\alpha$1 and a line L$\alpha$2, which are two lines along the inclined surface of the first swaged portion 14a in the cross section along the extending direction X of the ballpoint pen tip 11. The second inclination angle $\beta$ is an angle formed by a line L$\beta$1 and a line L$\beta$2, which are two lines along the inclined surface of the second swaged portion 14b in the cross section along the extending direction X of the ballpoint pen tip 11.

The angle 7 of the bottom wall 19 of the ball holding chamber 15 and the inclination angle (second inclination angle $\beta$) of the second swaged portion 14b are the same, Note that the wording "angles are the same" is defined in the present invention when the difference between the angles is within about ±3 degrees in view of its measurement error and the like.

As illustrated in FIG. 3, the angle $\gamma$ of the bottom wall 19 is an angle between one end and the other end of the bottom wall 19 along the outer circumferential direction of the ball 20 in the cross section along the extending direction X of the ballpoint pen tip 11. Specifically, the angle $\gamma$ of the bottom wall 19 is an angle formed by the line L$\gamma$1 and the line L$\gamma$2. Moreover, the angle is the angle on the side including the ball 20 (on the inside of the ball holding chamber 15) out of angles formed by the line L$\gamma$1 and the line L$\gamma$2. The line 141 is a straight line passing through one end of the bottom wall 19 along the outer circumferential direction of the hall 20 and the point of intersection of the bottom wall 19 and the central axis J in the cross section along the extending direction X of the ballpoint pen tip 11. The line L$\gamma$2 is a straight line passing through the other end portion of the bottom wall 19 along the outer circumferential direction of the ball 20 and the point of intersection of the bottom wall 19 and the central axis J in the cross section.

The ball 20 placed on the ball socket 19a is held in a state of being pushed toward the distal end portion of the ballpoint pen tip 11 by a coil spring 21.

In order to suppress ink leakage, it is preferable to configure that the coil spring 21 directly or via a pressing body pushes the ball 20, which is held at the distal end of the ballpoint pen tip 11 in a manner of allowing the ball 20 to rotate, against the inner wall of the tip distal end portion 13. Pushing the ball against the inner wall of the tip distal end portion 13 means pushing it toward the distal end side of the ballpoint pen tip 11. In addition, it is preferable to have a configuration further including a valve mechanism in which an aperture is created between the inner wall of the tip distal end portion 13 and the ball 20 by a pressing force when writing so as to flow out the ink, and even a minute aperture at the tip distal end is closed when not in use.

From the viewpoint of improving the writing taste, the pressing load to the ball 20 by the coil spring 21 is preferably set to 30 gf or less. In particular, the pressing load to the ball 20 by the coil spring 21 is preferably set to be in a range of 3 gf to 15 gf inclusive from the viewpoint of maintaining higher lubricity and easily maintaining a good writing taste even when the ball diameter of the ball 20 is 0.5 mm or less and a load is locally applied between the ball 20 and the ball socket 19a. Moreover, from the viewpoint of suppressing ink leakage and improving ink followability, the pressing load to the hall 20 by the coil spring 21 is preferably set to be in a range of 5 gf to 10 gf inclusive.

The arithmetic mean roughness (Ra) of the ball surface of the ball 20 is not limited. For example, the arithmetic mean roughness (Ra) of the ball surface is preferably set to be in a range of 0.1 nm to 12 nm inclusive. When the arithmetic mean roughness (Ra) is less than 0.1 nm, the surface of the ball is less likely to be sufficiently coated with the ink, consequently dark handwriting is difficult to obtain. While writing, skipping in line, and blur in handwriting are likely to occur. When the arithmetic mean roughness (Ra) is more than 12 nm, the surface of the ball is too rough, and there is a large rotational resistance between the ball 20 and the ball socket 19a. As a result of this, the writing taste is prone to be poor, and moreover, there is likely to be an influence on writing performance such as blur in handwriting, skipping in line, and unevenness in line. Taking it into more consideration, the arithmetic mean roughness (Ra) of the ball surface is preferably in a range of 0.1 nm to 10 nm inclusive, and more preferably in a range of 0.3 nm to 5 nm inclusive. The arithmetic mean roughness (Ra) can be determined by a model name SP13800N manufactured by Seiko Epson Corporation.

The material used for the ball 20 is not particularly limited. Regarding the material used for the ball 20, there can be exemplified: cemented carbide ball containing tungsten carbide as a main component; metal ball made of stainless steel or the like; ceramic ball made of silicon carbide, silicon nitride, alumina, silica, zirconia, or the like; and ruby ball, for example.

Examples of the material for the ballpoint pen tip 11 include: metal materials such as stainless steel, nickel silver, brass, aluminum bronze, and aluminum; and resin materials such as polycarbonate, polyacetal, and ABS. Among them, taking abrasion of the ball socket 19a and its stability over time into consideration, stainless steel is preferably used as the material for the ballpoint pen tip 11.

There is no limitation for the travel of the ball 20 of the ballpoint pen tip 11 in the extending direction X. For example, the travel of the ball 20 in the extending direction X is preferably in a range of 3 μm to 30 μm inclusive. When the travel is less than 3 μm, it is difficult to obtain a dark handwriting and an excellent writing taste, and when the travel is more than 30 μm, there is likely to be an influence on anti-sagging property of the ink. Taking it into more consideration, the travel of the ball 20 in the extending direction X is preferably in a range of 10 μm to 25 μm inclusive. This is because a space for storing the ink can be increased by the first swaged portion 14a and the second swaged portion 14b, but when the travel of the ball 20 in the extending direction X is less than 10 μm, a dark handwriting and an excellent writing taste are difficult to obtain.

In particular, when the ball diameter is a relatively small ball diameter of 0.5 mm or less, the ink consumption tends to be small, and there is likely to be an influence even on the writing taste. For this reason, the travel of the ball 20 of the ballpoint pen tip 11 in the extending direction X is preferably in a range of 12 μm to 25 μm inclusive, and taking it into more consideration, it is preferably in a range of 14 μm to 25 μm inclusive. Setting the travel of the ball 20 in the extending direction X within the above range is effective and hence preferable even in a case where the ball diameter is 0.4 mm or less, and is effective and preferable also even in a case where the ball diameter is 0.3 mm or less.

An ink consumption of the ballpoint pen 1 is preferably in a range of 20 mg to 70 mg inclusive per 100 m. When the ink consumption per 100 m is less than 20 mg, a dark handwriting and a good writing taste are difficult to obtain. This is because when the ink consumption per 100 m is more than 70 mg, there is likely to be an influence on the ink leakage suppression due to the aperture between the ball 20 and the tip distal end portion 13, and moreover the start of writing performance is impacted, and weeping and blobbing are likely to occur. Taking it into more consideration, the ink consumption per 100 m is preferably in a range of 20 mg to 60 mg inclusive.

In particular, when the ball diameter is a relatively small ball diameter of 0.5 mm or less, the ink consumption tends to be small, and there is likely to be an influence on the writing property such as writing taste and blurring. For this reason, the ink consumption per 100 m is preferably in a range of 20 mg to 50 mg inclusive, and taking it into more consideration, it is preferably in a range of 20 mg to 45 mg inclusive.

In a case where the ball diameter is 0.5 mm or less, not only the setting of the ink consumption but also the consideration of the relationship between the ink consumption and the ball diameter is effective in order to make darker handwriting, and to improve writing taste, and ink leakage suppression. Specifically, the ratio (ball diameter vs. ink consumption) of the ball diameter (mm) to the ink consumption (mg) per 100 m for the ballpoint pen 1 is preferably in a relationship with a range of 1:40 to 1:140 inclusive. The ratio in such relationship different from the conventional one is preferable since a darker handwriting, improved writing taste, and ink leakage suppression are easily obtained. Taking it into further consideration, the ratio (ball diameter vs. ink consumption) is preferably in a range of 1:50 to 1:130 inclusive, and more preferably in a range of 1:60 to 1:120 inclusive.

Note that, with respect to the ink consumption, the writing test with spiral drawings is carried out with five test samples at a writing speed of 4 m/min under the conditions of a writing angle of 70° and a writing load of 200 g on the writing paper in accordance with JS P 3201 at 20° C. Subsequently, the mean value of the ink consumption per 100 m is defined as the ink consumption per 100 m.

When the writing is done with the ballpoint pen 1 of the present embodiment configured as described above, an ink as an oil-based ballpoint pen ink composition flowed out of the ink reservoir cylinder 22 is fed from the ink distribution hole 16 through the ink distribution channel 17 to the ball 20 held in the ball holding chamber 15. By the feeding of the ink to the ball 20, the writing with the ink is made on the paper surface and the like.

As described above, the ballpoint pen 1 of the present embodiment includes the ball socket 19a and the sealing surface 14c. Note that, the tip distal end portion 13 of the ballpoint pen tip 11 is the swaged portion 14 having an inward swaged shape. The swaged portion 14 includes a first swaged portion 14a and a second swaged portion 14b. The first swaged portion 14a has a first inclination angle α with a range of 90 degrees to 100 degrees exclusive of 100 degrees. The second swaged portion 14b is provided closer to the distal end side of the ballpoint pen tip 11 than the first swaged portion 14a, and has a second inclination angle β with a range of 110 degrees to 130 degrees inclusive. Note that, the angle γ of the bottom wall 19 of the ball holding chamber 15 and the second inclination angle β of the second swaged portion 14b are the same.

The ballpoint pen 1 of the present embodiment includes the ball socket 19a and the sealing surface 14c, whereby an effect of making the rotation of the ball 20 smooth is achieved. Moreover, it is considered that the ink flow in the ball holding chamber 15 can be stabilized by the ink that flows into the ball holding chamber 15 from the ink distribution hole 16 and the ink (ink return) that has not been transferred to the paper surface from the tip distal end portion 13 and flows into the ball holding chamber 15 from the tip distal end portion 13. As a result of this, there is also achieved an effect of enabling to produce a stable ink outflow even when the ball socket 19a, and the sealing surface 14c are worn down.

When the ball socket 19a and the sealing surface 14c are formed, the ball 20 is transferred to the wall surface of the bottom wall 19 of the ball holding chamber 15 and to the wall surface of the inner wall of the second swaged portion 14b at the same angle. Therefore, even when the curvature is varied due to the spring back after the transference, the resultant curvature of the transfer surface is nearly the same, and hence the offset of the ball 20 can be reduced. Therefore, there can also be reduced uneven abrasion of the ball socket 19a and of the sealing surface 14c of the tip distal end portion 13 due to the rotation of the ball 20, 1n other words, there can be obtained stable rotation of the ball 20 and stable ink outflow.

Moreover, in the ballpoint pen 1 of the present embodiment, the first inclination angle α of the first swaged portion 14a of the tip distal end portion 13 is set to an obtuse angle with a range of 90 degrees to 100 degrees inclusive. By setting the first inclination angle α to the obtuse angle, an ink storing space between the ball 20 and the tip distal end portion 13 can be increased as compared with a case where the inclination angle (swaging angle) is less than 90 degrees. Therefore, the ink can be easily returned, the creeping up of the ink can be suppressed, and the decrease in ink outflow is suppressed, whereby dark handwriting, writing taste, and the wear (or abrasion) reduction of the ball socket can be easily improved.

Moreover, in the ballpoint pen 1 of the present embodiment, the second inclination angle β of the second swaged portion 14b is set to be in a range of 110 degrees to 130 degrees inclusive, whereby the ball holding force can be enhanced, and the second inclination angle β and the angle γ of the bottom wall 19 of the ball holding chamber 15 can be easily made the same.

Therefore, the ballpoint pen 1 of the present embodiment can realize stable rotation of the ball 20 and stable ink outflow in the ballpoint pen 1 with the ball 20 having a small diameter of 0.5 mm or less.

As described above, the pressing load to the ball 20 by the coil spring 21 is preferably in a range of 5 gf to 10 gf inclusive. When the pressing load to the ball 20 is in a range of 5 gf to 10 gf inclusive, a good writing taste can be easily maintained. In addition, when the pressing load to the ball 20 is within the above-described range, even in the case where the ball diameter is 0.5 mm or less, and a load is locally applied between the ball 20 and the ball socket 19a, a higher lubricity can be maintained and a good writing taste can be easily kept. Taking writing taste into consideration, the pressing load of the coil spring 21 is preferably set to 10 gf or less. Taking easy improvement of ink leakage suppression and ink followability into consideration, the pressing load of the coil spring 21 is more preferably 5 gf or more.

(Oil-Based Ballpoint Pen Ink Composition)

Next, an oil-based ballpoint pen ink composition used in the ballpoint pen 1 of the present embodiment will be specifically described.

The ink viscosity of the oil-based ballpoint pen ink composition used in the ballpoint pen 1 of the present embodiment is in a range of 500 mPa·s to 15000 mPa·s inclusive at 20° C. and a shear rate of 500 sec$^{-1}$ (during writing).

When the ink viscosity of the oil-based ballpoint pen ink composition is more than 15000 mPa·s, the ball rotation resistance while writing increases, the writing taste tends to be heavy, there is likely to be an influence on the wear reduction of the ball socket, and moreover the start of writing performance and the ink followability are prone to be impacted. For this reason, an oil-based ballpoint pen ink composition having an ink viscosity of 15000 mPa·s or less at 20° C. and a shear rate of 500 sec$^{-1}$ (during writing) is used for the oil-based ballpoint pen ink composition of the ballpoint pen 1. Taking improvements of writing taste and the wear reduction of the ball socket 19a into more consideration, the ink viscosity is preferably 10,000 mPa·s or less, and taking writing taste and wear reduction of the ball socket into more consideration, the ink viscosity is preferably 8000 mPa·s or less. The ink viscosity of the oil-based ballpoint pen ink composition is further preferably 6000 mPa·s or less. In addition, when the ink viscosity at 20° C. and a shear rate of 500 sec$^{-1}$ (during writing) is less than 10 mPa·s, there is likely to be an influence on the wear reduction of the ball socket, and an effect of bleeding or ink sagging is prone to appear in handwriting. For this reason, the oil-based ballpoint pen ink composition preferably has an ink viscosity of 10 mPa·s or more at 20° C. and a shear rate of 500 sec$^{-1}$ (during writing). Taking it into more consideration, the ink viscosity of the oil-based ballpoint pen ink composition is preferably 100 mPa·s or more, and moreover, taking the wear reduction of the ball socket into consideration, the ink viscosity is preferably 500 mPa·s or more, and taking it into more consideration, the ink viscosity is preferably 1000 mPa·s or more, and preferably 2000 mPa·s or more.

Here, for the purpose of improving the lubricity between the ball sockets 19a and the ball 20 of the ballpoint pen tip 11, there have been proposed many oil-based ballpoint pen ink compositions including various lubricants.

For example, there have been disclosed: Document A in which alkyl 3-D-glucoside is used ("Oil-based ball point ink" in JP H05-331403 A); Document B in which polyethylene glycol having an average molecular weight of 200 to 4000000 is used ("Oil-based ink composition for ball point pen" in JP H07-196971 A); Document C in which N-acylamino acid, N-acylmethyltauric acid, and N-acylmethylalanine are used ("oil-based ink for ballpoint pen" in JP 2007-17699.5 A); Document D in which a phosphoric acid ester is used ("Oil-based ink composition for ballpoint pens" in JP 3500552 B2); and the like.

However, when various lubricants as in Documents A to D are used, the wear of the ball socket 19a can be reduced while the writing taste is improved to some extent, but the lubricity is not satisfactory, and there is room for improvement. Moreover, when a small-diameter ball with a ball diameter of 0.5 mm or less is used, in the case of writing the same distance, the smaller the diameter of the ball, the larger the number of ball rotations. In addition, there is a load applied to the ball socket 19a when the ball has a small diameter, and hence the ball socket 19a is severely worn down, which is a cause of writing failure. For this reason, in the conventional technique, a new problem has been likely to occur when a small-diameter ball is used.

In addition, there has been a demand for an oil-based ballpoint pen ink composition that improves the start of writing performance at the time when the tip distal end portion 13 is dried in a state where the tip distal end portion 13 is left in the atmosphere. This is important since there is likely to be an influence on the start of writing performance especially in a case of using retractable oil-based ballpoint pens such as click-type oil-based ballpoint pens or rotating retractable-type oil-based ballpoint pens.

The present inventor has found that the lubricity can be increased, the wear reduction of the ball socket 19a and writing taste can be improved, and start of writing performance can be further improved by using an oil-based ballpoint pen ink composition having an ink viscosity satisfying the above-described range and containing a saturated fatty acid and a phosphoric acid ester having $C_1H_{22H-1}O$—$C_2H_4O$ or $C_mH_{2m+1}O$ (I, m:=1 to 30 inclusive) as the oil-based ballpoint pen ink composition used in the ballpoint pen 1 of the present embodiment.

When the ink composition contains a saturated fatty acid and a phosphoric acid ester having $C_1H_{22H-1}O$—$C_2H_4O$ or $C_mH_{2m+1}O$ (I, m=1 to 30 inclusive), a lubricating layer of the saturated fatty acid and the phosphoric acid ester improves the lubricity, whereby the lubricity between the ball 20 and the tip main body 12 can be maintained. Moreover, the wear of the ball socket 19a is reduced, thereby enabling to suppress blur in handwriting, and to improve the writing taste. Moreover, there can be improved the start of writing performance at the time when the tip distal end portion. 13 is dried in a state where the tip distal end portion 13 is left in the atmosphere.

(Saturated Fatty Acid)

The saturated fatty acid contained in the oil-based ballpoint pen ink composition can maintain the lubricity between the ball 20 and the tip main body 12 thereby reducing the wear of the ball socket 19a. When the oil-based ballpoint pen ink composition contains a saturated fatly acid, blur in handwriting can be suppressed and writing taste can be improved. In particular, even in the case of using a small-diameter ball with a ball diameter of 0.5 mm or less, the wear of the ball socket 19a can be reduced, whereby blur in handwriting can be suppressed, and favorable writing taste can be maintained. This is because when the saturated fatty acid is adsorbed on the ball 20 or the metal surface of the tip main body 12 of the ballpoint pen tip 11, the metal contact between the ball 20 and the tip main body 12 can be suppressed. For this reason, the wear of the ball socket 19a is reduced, so that blur in handwriting can be suppresses, and the writing taste can be improved. Moreover, favorable start of writing performance can be achieved.

Examples of the saturated fatty acid include branched saturated fatty acids and linear saturated fatty acids. Taking the wear reduction of the ball socket 19a and the writing taste into consideration, branched saturated fatty acids are preferable. The saturated fatty acid can have a bulky structure by using a saturated fatty acid having a branched chain, and covers an increased area of the metal surface. For this reason, the saturated fatty acid is more likely to be adsorbed on the ball 20 and the metal surfaces of the tip main body 12 of the ballpoint pen tip 11. Therefore, the metal contact between the ball 20 and the tip main body 12 can be suppressed, so that the wear of the ball socket can be reduced, blur in handwriting can be suppressed, and writing taste can be improved.

With respect to the saturated fatty acid, taking its lubricity into consideration, the number of carbon atoms of the saturated fatty acid is preferably in a range of 10 to 20 inclusive. This is because when it has 10 or more carbon atoms, the alkyl group has a length suitable for improving desired lubricity, and is more likely to be adsorbed on the metal surface of the ballpoint pen tip. However, when the saturated fatly acid has more than 20 carbon atoms, its alkyl group is excessively long, whereby the adsorption on the metal surface is inhibited by repulsion between molecules, and improvement in lubricity is likely to be impeded. Moreover, taking its lubricity into more consideration, the number of carbon atoms of the saturated fatty acid is preferably in a range of 16 to 20 inclusive, and in more consideration of improvement in the wear reduction of the ball socket 19a, the number of carbon atoms of the saturated fatty acid is preferably in a range of 18 to 20 inclusive.

Examples of the saturated fatty acid include: branched saturated fatly acids such as methyl branched undecanoic acid, methyl branched dodecanoic acid, methyl branched tridecanoic acid, methyl branched tetradecanoic acid methyl branched pentadecanoic acid, methyl branched hexadecanoic acid, methyl branched heptadecanoic acid, methyl branched octadecanoic acid (methyl branched stearic acid), methyl branched nonadecanoic acid, methyl branched icosanoic acid, and methyl branched docosanoic acid; and linear saturated fatty acids such as undecanoic acid, dodecanoic acid, tridecanoic acid, tetradecanoic acid, pentadecanoic acid, hexadecanoic acid, octadecanoic acid (stearic acid), octadecanoic acid, nonadecanoic acid, and docosanoic acid.

Among them, taking the wear reduction of the ball socket 19a, the suppression of blur in handwriting, and the improvement of writing taste into consideration, a methyl branched saturated fatty acid having a chemical structure in which a methyl group is branched from the main chain of a saturated fatty acid is preferable.

In other words, when the oil-based ballpoint pen ink composition contains a methyl branched saturated fatty acid, the lubricity can be improved by the lubricating layer including the methyl branched saturated fatty acid, and the lubricity between the ball 20 and the tip main body 12 can be maintained. In addition, the wear of the ball socket 19a is reduced, thereby enabling to suppress blur in handwriting and to improve the writing taste. Moreover, this is preferable since there can be achieved a favorable start of writing performance at the time when the ballpoint pen tip 11 (tip distal end portion 13) is dried in a state where the ballpoint pen tip 11 (tip distal end portion 13) is left in the atmosphere.

When a methyl branched saturated fatty acid is used, a bulky structure can be achieved, and the covered area of the ball 20 and the metal surface of the tip main body 12 of the ballpoint pen tip 11 is increased. That is, the methyl branched saturated fatty acid is more likely to be adsorbed on the ball 20 and the metal surface of the tip main body 12 of the ballpoint pen tip 11, and the metal contact between the ball 20 and the tip main body 12 of the ballpoint pen tip 11 can be suppressed. For this reason, a friction-mitigating effect is elicited, and writing resistance of the ballpoint pen tip 11 can be reduced. Therefore, the wear of the ball socket 19a is reduced, thereby enabling to suppress blur in handwriting and to improve the writing taste. Moreover, this is particularly effective since favorable start of writing performance can be achieved.

As described above, the ball diameter of the ball 20 of the ballpoint pen 1 of the present embodiment is 0.5 mm or less. The use of the methyl branched saturated fatty acid is effective since the wear of the ball socket 19a is reduced, blur in handwriting is suppressed, favorable writing taste is maintained even in the case of using a small-diameter ball with a ball diameter of 0.5 mm or less, and lubricity is easily maintained even in the case where a load is locally applied between the ball 20 and the ball socket 19a as in a small-diameter ball. In addition, its effect is remarkable since the effect is maintained even when the ball diameter is small, specifically, when the ball diameter is 0.4 mm or less, moreover 0.3 mm or less.

With respect to the methyl branched saturated fatty acid, taking its lubricity into consideration, the number of carbon atoms of the methyl branched saturated fatty acid is preferably in a range of 10 to 20 inclusive. This is because, when the methyl branched saturated fatty acid has 10 or more carbon atoms, its alkyl group has a length suitable for improving desired lubricity, and is more likely to be adsorbed on the metal surface of the ballpoint pen tip 11. On the other hand, when the saturated fatty acid has longer alkyl group with more than 20 carbon atoms, the adsorption on the metal surface is inhibited by repulsion between molecules, and improvement in lubricity is likely to be impeded. Moreover, taking its lubricity into more consideration, the number of carbon atoms of the methyl branched saturated fatty acid is preferably in a range of 16 to 20 inclusive. Taking the improvement of the wear reduction of the ball socket 19a into more consideration, the number of carbon atoms of the methyl branched saturated fatty acid is preferably in a range of 18 to 20 inclusive.

Note that, in place of or in addition to the methyl branched saturated fatty acid, a methyl branched unsaturated fatty acid can be used. Taking its lubricity into consideration, the methyl branched saturated fatty acid is preferably used.

Specific examples of the methyl branched saturated fatty acid include: methyl branched undecanoic acid, methyl branched dodecanoic acid, methyl branched tridecanoic acid, methyl branched tetradecanoic acid methyl branched pentadecanoic acid, methyl branched hexadecanoic acid, methyl branched heptadecanoic acid, methyl branched octadecanoic acid (methyl branched stearic acid), methyl branched nonadecanoic acid, and methyl branched docosanoic acid.

Among them, taking the wear reduction of the ball socket 19a, suppression of blur in handwriting and improvement of writing taste into consideration, methyl branched hexadecanoic acid, methyl branched octadecanoic acid (methyl branched stearic acid), and methyl branched icosanoic acid are preferable. Taking them into more consideration, 16-methyloctadecanoic acid (16-methylstearic acid) is preferable. This is effective since the lubricity tends to be maintained even in a case where a load is locally applied between the ball 20 and the ball socket 19a especially when the ball diameter is 0.5 mm or less. This is effective and hence preferable even in the case of the ball diameter being 0.4 mm or less, moreover this is effective and preferable even in the case of the ball diameter being 0.3 mm or less.

More specifically, examples of the preferred methyl branched saturated fatty acid include: 10-methylundecanoic acid, 10-methyldodecanoic acid, 12-methyltridecanoic acid, 12-methyltetradecanoic acid, 14-methylpentadecane acid, 14-methylhexadecane acid, 16-methylheptadecanoic acid, 16-methyloctadecanoic acid (16-methylstearic acid), 10-methylnonadecanoic acid, 10-methylheptadecanoic acid, 10-methylhexadecanoic acid, and 10-methylpentadecanoic acid.

The content of the saturated fatty acid is preferably in a range of 0.1% by mass to 10% by mass inclusive with respect to the total amount of the oil-based ballpoint pen ink composition; taking the lubricity into more consideration, the content is preferably in a range of 0.5% by mass to 10% by mass inclusive; and moreover taking ink stability over time and the like into consideration, the content is preferably in a range of 1% by mass to 5% by mass inclusive. When the content of the saturated fatty acid with respect to the total amount of the oil-based ballpoint pen ink composition is less than 0.1% by mass, there is a concern that a desired lubricating effect is not achieved, and when the content is more than 10% by mass, there is a concern that there is an influence on the ink stability over time.

(Phosphoric Acid Ester)

Taking the improvement of the lubricity and the suppression of the writing resistance of the ballpoint pen tip 11 into consideration, the oil-based ballpoint pen ink composition preferably contains a phosphoric acid ester.

Moreover, taking the wear reduction of the ball socket 19a and an improvement in writing taste into more consideration, a phosphoric acid ester having $C_lH_{22H-1}O\text{—}C_2H_4O$ Or $C_mH_{2m+1}O$ (1, m=1 to 30 inclusive) is preferably used. This is because a phosphoric acid ester having $C_lH_{22H-1}O\text{—}C_2H_4O$ (alkoxyethyl group) or $C_mH_{2m+1}O$ (alkoxyl group) forms a lubricating layer, whereby the lubricity of the ballpoint pen tip 11 is easily enhanced, the wear of the ball socket 19a is reduced, and blur in handwriting is suppressed, and writing taste is easily improved. This is particularly effective when used for the oil-based ballpoint pen 1.

Owing to a lubricating effect from an interaction of two lubricating layers formed by combined use of a saturated fatty acid and a phosphoric acid ester, there can be achieved a high lubricity that has not been conventionally obtained. In particular, a combined use of a methyl branched saturated fatty acid and the phosphoric acid ester having $C_lH_{22H-1}O\text{—}C_2H_4O$ or $C_mH_{2m+1}O$ (1, m=1 to 30) is preferable. Moreover, this is effective since a higher lubricity is maintained even in the case where a load is locally applied between the ball 20 and the ball socket 19a when the ball diameter is 0.5 mm or less. This is effective and hence preferable even when the ball diameter is 0.4 mm or less, and is effective and preferable even when the ball diameter is 0.3 mm or less. Moreover, favorable start of writing performance can be achieved.

With respect to the phosphoric acid ester, taking its stability in the ink and the easiness of improving lubricity into consideration, a phosphoric acid ester that is represented by the general formula (Chemical Formula 1) or (Chemical Formula 2) is preferable. This is because, in the phosphoric acid esters of the general formula (Chemical Formula 1) or (Chemical Formula 2), O adjacent to P in the structures of the general formula (Chemical Formulas 1) or (Chemical Formula 2) is adsorbed on the ball or the ballpoint pen tip main body made of a metal, and $C_lH_{22H-1}O\text{—}C_2H_4O$ (alkoxyethyl group) or $C_mH_{2m+1}O$ (alkoxyl group) forms a lubricating layer. Therefore, the lubricity is improved, the wear of the hall socket 19a is reduced, so that the suppression of blur in handwriting and writing taste are easily improved. In particular, taking the wear reduction of the ball socket 19a into consideration, the phosphoric acid esters of the general formula (Chemical Formula 1) having $C_lH_{22H-1}O\text{—}C_2H_4O$ (alkoxyethyl group) are preferably used,

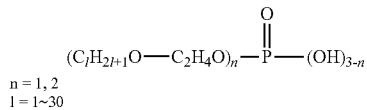

(Chemical Formula 1)

n = 1, 2
l = 1~30

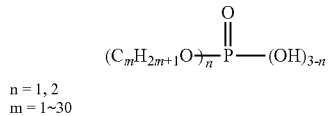

(Chemical Formula 2)

n = 1, 2
m = 1~30

Among the phosphoric acid esters represented by the general formula (Chemical Formula 1) or (Chemical Formula 2), the carbon chain (1, m) in the terminal alkyl group of $C_lH_{22H-1}O$—$C_2H_4O$ (alkoxyethyl group) or $C_mH_{2m+1}O$ (alkoxyl group) is preferably a specific carbon chain (l, m). This effect is expected as follows.

The carbon chain (l, m) in the terminal alkyl group of $C_lH_{22H-1}O$—$C_2H_4O$ or $C_mH_{2m+1}O$ is preferably in a range of 1 to 15 inclusive. When the carbon chain (l, m) in the terminal alkyl group of $C_lH_{22H-1}O$—$C_2H_4O$ or $C_mH_{2m+1}O$ is more than 15, the writing taste and start of writing performance are favorable, but the carbon chain is too long, and the wear reduction of the ball socket 19a is difficult to obtain. This is because the carbon chains tend to be entangled with each other, and the carbon chains are arranged in random orientation and not in side-by-side arrangement, as a result a lubricating layer having sufficient lubricity cannot be produced, and the wear reduction of the ball socket 19a is difficult to obtain. Moreover, when the carbon chain (l, m) in the terminal alkyl group is more than 15, the polarity of the terminal alkyl group gets close to the lower polarity side, and hence the affinity for a polar organic solvent is poor, consequently there is likely to be an influence on the dissolution stability. In particular, in a case of a glycol ether solvent, the dissolution stability is prone to be impacted, and a problem is likely to occur in dissolution stability in the ink. For this reason, metal salt precipitates are prone to be generated due to the influence of metal ions and the like in the metal tips in long-term storage, and the ink stability over time is likely to be deteriorated, and the lubricating effect as in the present invention is difficult to obtain. Therefore, the carbon chain (l, m) in the terminal alkyl group is preferably in a range of 1 to 15 inclusive. Taking it into more consideration, the carbon chain (l, m) in the terminal alkyl group is preferably in a range of 1 to 10 inclusive. Taking the wear reduction of the ball socket 19a and the suppression of blur in handwriting into more consideration, the carbon chain (l, m) in the terminal alkyl group is preferably in a range of 1 to 5 inclusive.

In contrast, when the carbon chain (l, m) in the terminal alkyl group is three or less, the wear reduction of the ball socket 19a is favorable, but the lubricating layer having the alkyl group with a sufficient thickness cannot be obtained in the ink. For this reason, the lubricating layer has an insufficient cushioning property between the ball 20 and the ball socket 19a, and thus there is likely to be an influence on the writing taste, the start of writing performance, and the wear reduction of the ball socket 19a. Therefore, it is preferable to use butoxyethyl acid phosphate (l=4), butyl acid phosphate (m=4) or the like in which the terminal alkyl group has a butyl group (with four carbon chains in the terminal alkyl group), since an effect of reducing the wear of the ball socket 19a and of improving the writing taste and the start of writing performance can be easily obtained. In particular, butyl acid phosphate having a butoxyethyl group ($C_4H_9OCH_2CH_2O$ with four carbon chains in the terminal alkyl group) is preferable. This is effective and hence preferable in the wear reduction of the ball socket 19a since the lubricity is easily maintained even in a case where a load is locally applied between the ball 20 and the ball socket 19a in particular when the ball diameter is 0.5 mm or less. This is effective and hence preferable even when the ball diameter is 0.4 mm or less, and this is effective and preferable even when the ball diameter is 0.3 mm or less.

Moreover, examples of the phosphoric acid esters as in the general formula (Chemical Formula 1) or (Chemical Formula 2) include: monoesters of phosphoric acid esters (n=1 in Chemical Formula 1 or Chemical Formula 2); diesters of phosphoric acid esters (n=2 in Chemical Formula 1 or Chemical Formula 2); triesters of phosphoric acid esters (n=3 in Chemical Formula 1 or Chemical Formula 2); and mixtures thereof. Among them, taking the wear reduction of the ball socket 19a and writing taste into consideration, a mixture of a monoester of a phosphoric acid ester (n=1 in Chemical Formula 1 or Chemical Formula 2) and a diester of a phosphoric acid ester (n=2 in Chemical Formula 1 or Chemical Formula 2) is preferably used, this is because a triester of the phosphoric acid ester (n=3 in Chemical Formula 1 or Chemical Formula 2) contains too many $C_lH_{22H-1}O$—$C_2H_4O$ (alkoxyethyl group) and $C_mH_{2m+1}O$ (alkoxyl group), whereby there is likely to be an influence on ink stability over time.

Moreover, taking the wear reduction of the ball socket 19a into consideration, a mixture of a monoester of a phosphoric acid ester and a diester of a phosphoric acid ester is preferable. Regarding the mixing ratio in that case, the diester of a phosphoric acid ester (n=2 in Chemical Formula 1 or Chemical Formula 2) has an advantage in lubricity because of containing many $C_lH_{22H-1}O$—$C_2H_4O$ (alkoxyethyl group) and $C_mH_{2m+1}O$ (alkoxyl group). Moreover, the more the diester of the phosphoric acid ester, the more preferable, since the ink stability over time can also be maintained. Therefore, the mixing ratio of the monoester of a phosphoric acid ester to the diester of a phosphoric acid ester is preferably in the range from 1:1 to 1:5 inclusive, and taking it into further consideration, the mixing ratio is preferably in the range from 1:1 to 1:3 inclusive.

With respect to specific examples of the phosphoric acid ester as in the general formula (Chemical Formula 1) or (Chemical Formula 2), examples of the general formula (Chemical Formula 1) includes butoxyethyl acid phosphate (l=4). Examples of (Chemical Formula 2) include: methyl acid phosphate (m=1), ethyl acid phosphate (m=2), butyl acid phosphate (m=4), 2-ethylhexyl acid phosphate (m=8), isodecyl acid phosphate (m=10), lauryl acid phosphate (m=12), alkyl (m=12, 14, 16, or 18) acid phosphate, isotridecyl acid phosphate (m=13), oleyl acid phosphate (m=18), and tetracosyl acid phosphate (m=24).

The content of the phosphoric acid ester having $C_lH_{22H-1}O$—$C_2H_4O$ or $C_mH_{2m+1}O$ (l, m=1 to 30 inclusive) is more preferably in a range of 0.1% by mass to 10% by mass inclusive with respect to the total amount of the oil-based ballpoint pen ink composition. This is because when the content is less than 0.1% by mass, the desired lubricity tends to be difficult to obtain, and when the content is more than 10% by mass, the ink tends to be unstable over time. Taking these tendencies into consideration, the content is preferably in a range of 0.1% by mass to 5% by mass inclusive, and taking them into more consideration, the content is preferably in a range of 0.3% by mass to 3% by mass inclusive.

The total content of the saturated fatty acid with respect to the total amount of the oil-based ballpoint pen ink composition is denoted by X, and the content of the phosphoric acid ester having $C_lH_{22H-1}O$—$C_2H_4O$ or $C_mH_{2m+1}O$ (l, m=1 to 30 inclusive) with respect to the total amount of the ink composition is denoted by Y. In this case, taking the wear reduction of the ball socket 19a and the improvement of writing taste into consideration, a relationship of $0.1 \leq X/Y \leq 5$ is preferable, and taking them into more consideration, a relationship of $0.3 \leq X/Y \leq 3$ is preferable, and moreover a relationship of $0.5 \leq X/Y \leq 2$ is preferable.

(Organic Amine)

When using the saturated fatty acid and the phosphoric acid ester having $C_lH_{22H-1}O$—$C_2H_4O$, or $C_mH_{2m+1}O$ (l, m=1 to 30 inclusive), an organic amine is preferably used. This is because the saturated fatty acid and the phosphoric acid ester can be neutralized with an organic amine to be dissolved and stabilized in the ink. For this reason, the effects of the saturated fatty acid and the phosphoric acid ester are more likely to be obtained, and the stability over time of other ink components such as a colorant can be easily improved. Taking the stability of the organic amine with the saturated fatty acid, the phosphoric acid ester, and a colorant into consideration, a secondary amine or a tertiary amine is preferably used. This is because, with respect to the reactivity in the oil-based ink, the primary amine has the strongest reactivity, the secondary amine has lower reactivity followed by the tertiary amine. The primary amine is more likely to react with the phosphoric acid ester, the saturated fatly acid, a colorant, and other components, and hence there is likely to be an influence on the ink stability over time. Therefore, a secondary amine or a tertiary amine is preferably used, and taking it into more consideration, a tertiary amine is preferably used.

Specific examples of the organic amine include amines having ethylene oxide (oxyethylene alkylamine, polyoxyethylene alkylamine, etc.), aliphatic amines such as alkylamines (laurylamine, stearylamine, etc.), distearylamine, and dimethylalkylamines (ditnethyllaurylamine, dimethylsteatylamine, dimethyloctylamine, etc.). Among them, taking its stability in the ink into consideration, amines having ethylene oxide, or dimethylalkylamines are preferable, and taking it into more consideration, amines having ethylene oxide are preferable.

Moreover, taking its stability with the phosphoric acid ester, the saturated fatty acid, a colorant, and other components into consideration, the total amine value of the organic amine is preferably in a range of 100 (mgKOH/g) to 300 (mgKOH/g) inclusive. When the total amine value is more than 300 (mgKOH/g), the organic amine has a strong reactivity, and is likely to react with the above-mentioned components, and hence the ink stability over time is prone to be poor. When the total amine value is less than 100 (mgKOH/g), there is likely to be an influence on the stabilities of the saturated fatty acid and the phosphoric acid ester having $C_1H_{22H-1}O$—$C_2H_4O$ or $C_mH_{2m+1}O$ (1, m=1 to 30 inclusive) in the ink. When the organic amine is used in the ballpoint pen 1, its adsorption on the ball 20 and metals of the tip main body 12 or the like tends to be poor, and the lubrication performance is difficult to obtain. Taking its stability with the above-mentioned components and the lubricity into more consideration, the total amine value is preferably in a range of 150 (mgKOH/g) to and 300 (mgKOH/g) inclusive; taking its stability into more consideration, the total amine value is preferably in a range of 200 (mgKOH/g) to 300 (mgKOH/g) inclusive; and taking it into the foremost consideration, the total amine value is preferably in a range of 230 (mgKOH/g) to 270 (mgKOH/g) inclusive.

Note that the total amine value is an indication of the total amount of primary, secondary, and tertiary amines, and is represented by the number of milligrams of potassium hydroxide equivalent to the hydrochloric acid required to neutralize one gram of a sample.

Examples of the organic amine include oxyethylene alkylamine and polyoxyethylene alkylamine. Specific examples of oxyethylene alkylamine and polyoxyethylene alkylamine include NYMEEN L-201 (Total amine value: 232 to 246, a secondary amine), NYMEEN L-202 (Total amine value: 192 to 212, a tertiary amine), NYMEEN L-207 (Total amine value: 107 to 119, a tertiary amine), NYMEEN S-202 (Total amine value: 152 to 166, a tertiary amine), NYMEEN S-204 (Total amine value: 120 to 134, a tertiaty amine), NYMEEN S-210 (Total amine value: 75 to 85, a tertiary amine), NYMEEN DT-203 (Total amine value: 227 to 247, a tertiary amine), and NYMEEN DT-208 (Total amine value: 146 to 180, a tertiary amine) (manufactured by NOF Corporation), Specific examples of alkylamine include: FARMIN 80 (Total amine value: 204 to 210, a primary amine), FARMIN D86 (Total amine value: 110 to 119, a secondary amine), FARMIN DM2098 (Total amine value: 254 to 265, a tertiary amine), FARMIN DM8680 (Total amine value: 186 to 197, a tertiary amine) (Kao Corporation); NISSAN tertiary amine BB (Total amine value: 243 to 263, a tertiary amine), and NISSAN tertiary amine FB (Total amine value: 230 to 250, a tertiary amine) (manufactured by NOF Corporation). These may be used alone or in combination of two or more.

Taking its stability with the saturated fatty acid, the phosphoric acid ester, a colorant, and other components into consideration, the content of the organic amine is preferably in a range of 0.1% by mass to 10% h mass inclusive with respect to the total amount of the oil-based ballpoint pen ink composition, and taking the neutralization against a surfactant to be described later into consideration, the content is preferably in a range of 0.5% by mass to 5% by mass inclusive.

The total content of the phosphoric acid ester and the saturated fatty acid with respect to the total amount of the ink composition is denoted by A, and the content of the organic amine with respect to the total amount of the ink composition is denoted by B. In this case, taking the ink stability over time by neutralization into consideration, a relationship of $0{,}01 \leq A/B \leq 5$ is preferable, and taking it into more consideration, a relationship of $0.1 \leq A/B \leq 3$ is preferable, and moreover a relationship of $0.1 \leq A/B \leq 1$ is preferable, (Colorant)

A colorant used in the oil-based ballpoint pen ink composition of the present embodiment is not particularly limited, and dyes, pigments, and the like can be appropriately selected and used, and dyes and pigments may be used in combination. Examples of dyes include oil-soluble dyes, acid dyes, basic dyes, and metal-complex dyes, and examples of various types of salt-forming dyes of these dyes include salt-forming dyes of an acid dye and a basic dye, salt-forming dyes of a basic dye and an organic acid, and salt-forming dyes of an acid dye and an organic amine. These dyes may be used alone or in combination of two or more thereof.

Specific examples of dyes include: Valifast Black 1802, Valifast Black 1805, Valifast Black 1807, Valifast Violet 1701, Valifast Violet 1704, Valifast Violet 1705, Valifast Blue 1601, Valifast Blue 1605, Valifast Blue 1613. Valifast Blue 1621, Valifast Blue 1631, Valifast Red 1320, Valifast Red 1355, Valifast Red 1360, Valifast Yellow 1101, Valifast Yellow 1151, Nigrosine Base EXBP, Nigrosine Base EX, BASE. OF BASIC DYES ROB-B, BASE. OF BASIC DYES RO6G-B, BASE OF BASIC DYES VPB-B, BASE OF BASIC DYES VB-B, BASE OF BASIC DYES MVB-3 (all of which are manufactured by Orient Chemical Industries Co., Ltd.); Aizen Spilon Black GOTH-special, Aizen Spilon Violet C-RH, Aizen Spilon Blue GNH, Aizen Spilon Blue 2BNH, Aizen Spilon Blue C-RH, Aizen Spilon Red C-GH, Aizen Spilon Red C-BH, Aizen Spilon Yellow C-GNH, Aizen Spilon Yellow C-2GH, S.P.T. Blue 111, S.P.T. Blue GLSH-Special, S.P.T. Red 533, S.P.T. Orange 6, S.B.N. Yellow 510, S.B.N. Yellow 530, and S.R.C-BH (all of which are manufactured by Hodogaya Chemical Co., Ltd.).

Moreover, as a colorant, taking its stability over time based on the compatibility with a saturated fatty acid and a phosphoric acid ester into consideration, it is preferable to use at least a salt-forming dye. Moreover, in view of the fact that the stability over time can be maintained by the stability of the salt-forming bond, it is preferable to use a salt-forming dye of a basic dye and an organic acid, a salt-forming dye of an acid dye and a basic dye, or a salt-forming dye of an acid dye and an organic amine.

Taking it into more consideration, it is preferable to use a salt-forming dye of a basic dye and an organic acid, or a salt-forming dye of an acid dye and an organic amine. Taking it into more consideration, it is preferable to use one from among a salt-forming dye including an azo-based skeleton dye, a salt-forming dye including a xanthene-based dye, and a salt-forming dye including an aromatic amine. Among them, for the reason that there is less likely to be an influence on the saturated fatty acid and the phosphoric acid ester owing to the binding stability, it is preferable to use one out of a salt-forming dye of an azo-based basic dye and an organic acid, and a salt-forming dye of an acid dye and an aromatic amine.

With respect to an organic acid in the salt-forming dye of a basic dye and an organic acid, an organic acid having a phenylsulfone group is preferable since it easily forms a lubricating film which tends to be adsorbed on a metal, thereby enhancing lubricity, and improving writing taste and the wear reduction of the ball socket. Moreover, taking the long-term stability in the ink into consideration, alkylbenzenesulfonic acid is preferably used as an organic acid.

With respect to the acid dye and the organic amine, in order to improve light resistance while enhancing the lubricity, an acid metal-complex dye containing Cu, Cr, Fe, or Co is preferable, and a salt-forming dye of an acid metal-complex dye and an organic amine is preferably used. In order the acid metal-complex dye to be stabilized in an oil-based ink, from among organic amines, an amine having an aromatic ring is preferably used in the neutralization reaction to produce the salt-forming dye.

Regarding the acid metal-complex dye taking the improvement of the stability over time in the ink into consideration, an acid metal-complex dye containing Cu is preferably used. Moreover, phthalocyanine acid dyes, azo acid dyes, and the like are exemplified, and among them, copper phthalocyanine acid dyes are preferably used. Moreover, there can be exemplified one that a sulfo group ($-SO_3H$), a carboxyl group ($-COOH$), or the like is included in the structure of the acid metal-complex dye. Taking the improvement of the lubricity into more consideration, an acid metal-complex dye including a sulfo group ($-SO_3H$) is preferable. This is considered to easily improve the lubricity since when a sulfo group ($-SO_3H$) is included, a strong lubricating layer is easily formed between the ball 20 and the ball socket 19*a*. It is also considered that when the acid metal-complex dye is used together with an amine having an aromatic ring, a synergistic lubricating effect can also be obtained.

Examples of the pigment include inorganic pigments, organic pigments, and prepared pigments. Specific examples thereof include carbon black, aniline black, ultramarine blue, chrome yellow, titanium oxide, iron oxide, phthalocyanine-based, azo-based, quinacridone-based, diketopyrrolopyrrole-based, quinophthalone-based, threne-based, triphenylmethane-based, perinone-based, perylene-based, dioxazine-based pigments, meanie pigments, pearl pigments, fluorescent pigments, and phosphorescent pigments.

As the colorant, taking the lubricity into consideration, a pigment is preferably used. This is because when pigment particles are used the pigment particles enter into the gap between the ball 20 and the tip main body 12, and they tend to act as a bearing. For this reason, the metal contact can be suppressed, and an effect of enhancing the lubricity, improving writing taste, and reducing the wear of the ball socket 19*a* is easily obtained. In particular, the lubricity is easily maintained by a synergistic effect owing to a bearing action between the pigment particles and the lubricating layer of the saturated fatty acid and the phosphoric acid ester having $C_1H_{22H-1}O-C_2H_4O$ or $C_mH_{2m+1}O$ (1, m=1 to 30 inclusive). For this reason, the wear of the ball socket 19*a* can be reduced and the writing taste can be improved. Taking the gap relationship inside the ballpoint pen tip 11 into consideration, the average particle size of the pigment is preferably in a range of 1 nm to 500 nm inclusive. The average particle size is more preferably in a range of 30 nm to 350 nm inclusive, and still more preferably in a range of 50 nm to 300 nm inclusive. The average particle size can be determined by a laser diffraction method, specifically with use of a laser diffraction particle size distribution analyzer (trade name: MicrotracHRA 9320-X100, Nikkiso Co., Ltd.), from a particle size (D50) at 50% in volume-based cumulative particle size distributions measured based on a numerical value calibrated using a standard sample or another measurement method.

Note that, it is preferable to determine the particle size of the pigment in its dispersed state, since the above-mentioned action and effect is exerted in the dispersed state of the pigment in the oil-based ballpoint pen ink composition. Moreover, the pigment is preferable because it is excellent in water resistance and light resistance, and good color development can be obtained.

With respect to the type of pigment, taking the lubricity based on the compatibility with the saturated fatty acid and the phosphoric acid ester having $C_1H_{22H-1}O-C_2H_4O$ or $C_mH_{2m+1}O$ (1, m=1 to 30 inclusive) into consideration, it is preferable to use the type of pigment from among carbon black, quinacridone-based pigments, threne-based pigments, and diketopyrrolopyrrole-based pigments; and taking ink stability over time based on the compatibility over time into consideration, a diketopyrrolopyrrole-based pigment is preferably used.

The content of the colorant is preferably in a range of 5% by mass to 30% by mass inclusive with respect to the total amount of the oil-based ballpoint pen ink composition. When the content is less than 5% by mass, a dark handwriting tends to be difficult to obtain, and when the content is more than 30% by mass, there is likely to be an influence on its solubility in the ink. Taking the tendencies into more consideration, the content is preferably in a range of 7% by mass to 25% by mass inclusive, and taking them into more consideration, the content is preferably in a range of 10% by mass to 20% by mass inclusive.

(Organic Solve)

Examples of the organic solvent used in the oil-based ballpoint pen ink composition of the present embodiment include organic solvents commonly used as an ink for writing instruments, and example thereof include: glycol ether solvents such as ethylene glycol monomethyl ether, ethylene glycol monoethyl ether, ethylene glycol monobutyl ether, ethylene glycol dimethyl ether, ethylene glycol monophenyl ether, propylene glycol monomethyl ether, propylene glycol monoethyl ether, diethylene glycol dimethyl ether, 3-methoxybutanol, and 3-methoxy-3-methylbutanol; glycol solvents such as diethylene glycol, triethylene glycol, polyethylene glycol, propylene glycol, dipropylene glycol, butylene glycol, and ethylene glycol; and alcohol solvents such as benzyl alcohol, methanol, ethanol, 1-propanol, 2-propanol, isopropanol, isobutanol, t-butanol, propargyl alcohol, ally alcohol, 3-methyl-1-butyn-3-ol, ethylene glycol monomethyl ether acetate, and other higher alcohols.

Among these organic solvents, taking the solubility with the saturated fatty acid or the phosphoric acid ester having $C_1H_{22H-1}O$—$C_2H_4O$ or $C_mH_{2m+1}O$ (1, m=1 to 30 inclusive) into consideration, a glycol ether solvent is preferably used since an effect of improving lubricity is easily obtained. This is for dissolution stabilization since a glycol ether solvent tends to have an enhanced affinity with the saturated fatty acid, the phosphoric acid ester having $C_1H_{22H-1}O$—$C_2H_4O$ or $C_mH_{2m+1}O$ (1, m=1 to 30 inclusive). For this reason, the ink is easily stabilized over time even in long-term storage.

Moreover, when a glycol ether solvent is used, moisture is easily absorbed, and hence it is easy to soften the strength of a coating film formed when the tip distal end portion 13 is dried, and also to improve the start of writing performance. For this reason, it is more effective to use a glycol ether solvent together with a surfactant described later, and taking its stability in the ink into consideration, an aromatic glycol ether solvent is preferably used.

As an organic solvent other than the glycol ether solvent, an alcohol solvent is preferably used. This is because an alcohol solvent is volatilized and the tip distal end portion 13 is easily dried. Therefore, this is preferable since the thickening of the inside of the writing distal end portion (the inside of the tip distal end portion 13) can be achieved more quickly, thereby enabling to suppress the ink leakage from the aperture at the writing distal end portion and to enhance the ink leakage suppression performance. Moreover, it is preferable to use at least an aromatic alcohol such as benzyl alcohol since it also has an effect of improving lubricity. Therefore, the combined use of a glycol ether solvent and an alcohol solvent is preferable.

Taking the improvements of solubility, handwriting dryness, bleeding, and the like into consideration, the content of the organic solvent is preferably in a range of 10% by mass to 70% by mass inclusive with respect to the total amount of the oil-based ballpoint pen ink composition. Taking the drying property at the tip distal end portion 13 into consideration, the content of the alcohol solvent is preferably in a range of 30% by mass to 90% by mass inclusive, and more preferably in a range of 50% by mass to 90% by mass inclusive with respect to the total organic solvent.

(Resin)

In the present invention, a resin may be used as a viscosity modifier. Specific examples of the viscosity modifier include a polyvinyl butyral resin, a polyacetal resin, a polyvinyl alcohol resin, a cellulose resin, a polyvinyl pyrrolidone resin, a ketone resin, a terpene resin, an alkyd resin, a phenoxy resin, and a polyvinyl acetate resin.

Among them, the ketone resin is preferable since it can make it easier to reduce the wear of the ball socket 19a and to suppress blur in handwriting. In particular, the ketone resin is preferable since it has a good compatibility with the saturated fatty acid and the phosphoric acid ester, does not impair the lubricity as a feature of the present invention, and synergistically improves the lubricity, so that the wear of the ball socket 19a is more easily reduced.

Among the ketone resins, it is preferable to use a ketone resin having a ring structure such as an aromatic ring skeleton (including a benzene ring such as a phenyl group, an acetophenone group, or a naphthalene group) or a cyclohexane skeleton (including a cyclohexane ring such as a cyclohexane group or a cyclohexanone group). This is because a cushioning effect owing to the ketone resin having a ring structure is obtained, whereby it is easy to improve lubricity, to reduce the wear of the ball socket 19a, and to suppress blur in handwriting. More preferably, a ketone resin having an aromatic ring is preferable since it has a large number of double bond structures so that a stronger cushioning effect is easily obtained, which is effective for lubricity.

Moreover, the ketone resin preferably has a hydroxyl value of 100 (mgKOH/g) or more because when the hydroxyl value is 100 (mgKOH/g) or more, the ketone resin is easily dissolved in an organic solvent such as an alcohol solvent or a glycol solvent. For this reason, it is easy to obtain an effect of reducing the wear of the ball socket 19a owing to an interaction from the combined use of the methyl branched fatty acid and the phosphoric acid ester. Taking the further reduction of the wear of the ball socket 19a, into consideration, the hydroxyl value of the ketone resin is preferably 200 (mgKOH/g) or more, taking it into more consideration, the hydroxyl value of the ketone resin is preferably 300 (mgKOH/g) or more. This is preferable since even in a case where a load is locally applied between the hall 20 and the ball socket 19a especially when the ball diameter is 0.5 mm or less, the lubricity is easily maintained, which is effective for the wear reduction of the ball socket 19a. In addition, this is effective and hence preferable even when the ball diameter is 0.4 mm or less, and this is effective and preferable even when the ball diameter is 0.3 mm or less.

Note that, the ketone resin can make it easier to reduce the wear of the ball socket 19a, but is difficult to sufficiently improve writing taste. For this reason, the ketone resin is preferably used together with a polyvinyl butyral resin.

When the polyvinyl butyral resin is used together with the saturated fatty acid and the phosphoric acid ester, a lubricating layer that can provide a higher lubricating effect is easily formed. For that reason, an elastic ink layer is always formed between the hall 20 and the ball socket 19a, whereby their direct contact is less likely to occur, so that the writing taste is easily improved. Moreover, the use of the polyvinyl butyral resin is preferable, since it forms a coating film, with which ink leakage is more easily reduced. When a pigment is used as a colorant, a polyvinyl butyral resin is preferably used since a pigment dispersion effect can also be obtained.

Here, the polyvinyl butyral resin is a product of the reaction of polyvinyl alcohol (PVA) with butyraldehyde (BA), and has a structure including a butyral group, an acetyl group, and a hydroxyl group.

The polyvinyl butyral resin preferably contains a hydroxyl group in an amount of 25% by mole or more. This is because a polyvinyl butyral resin having a hydroxyl group in an amount of less than 25% by mole is not sufficiently soluble in an organic solvent, and hence a sufficient effect of improving writing taste and an effect of suppressing ink leakage are difficult to obtain. Moreover, taking the start of writing performance based on hygroscopicity into consideration, this is because it is preferable to use a polyvinyl butyral resin having a hydroxyl group in an amount of 25% by mole or more. The polyvinyl butyral resin having a hydroxyl group in an amount of 30% by mole or more is preferable since the writing taste is easily improved. This is because frictional heat is generated by the rotation of the ball 20 while writing, whereby the ink at the tip distal end portion 13 is warmed, and the temperature of the ink rises. Unlike other resins, the polyvinyl butyral resin has a property with which the ink viscosity is less likely to decrease even when the ink temperature rises. For this reason, an elastic ink layer is always formed between the ball 20 and the ball socket 19a, whereby their direct contact is less likely to occur, so that the writing taste tends to be improved. In contrast, with use of the polyvinyl butyral resin having a hydroxyl group in an amount more than 40% by mole, the moisture absorption tends to increase, and there is likely to be an influence on the stability over time with the ink component. For this reason, a polyvinyl butyral resin having a hydroxyl group in an amount of 40% by mole or less is preferable. In addition, a polyvinyl butyral resin having a hydroxyl group in a range of an amount of 30% by mole to 40% by mole is preferable, and a polyvinyl butyral resin having a hydroxyl group in a range of an amount of 30% by mole to 36% by mole inclusive is more preferable.

Note that the amount (mol %) of hydroxyl group of the polyvinyl butyral resin indicates the content (mol %) of the hydroxyl group with respect to the total mole amount of the butyral group (mol %), the acetyl group (mol %), and the hydroxyl group (mol %).

With respect to the average degree of polymerization of the polyvinyl butyral resin, when the average degree of polymerization is 200 or more, the ink leakage suppression performance is easily improved, and when the average degree of polymerization is more than 2500, the ink viscosity becomes excessively high, and tends to have an influence on the writing taste. Therefore, the average degree of polymerization is preferably in a range of 200 to 2500 inclusive. Moreover, taking writing taste and suppression of ink leakage into more consideration, the average degree of polymerization is preferably 1500 or less, and more preferably 1000 or less. The average degree of polymerization represents the number of base units included in one molecule of the polyvinyl butyral resin, and there can be adopted a value measured based on a method specified in JIS K 6728 (2001 edition).

When a ketone resin and a polyvinyl butyral resin are used in combination, the content of the ketone resin with respect to the total amount of the ink composition is denoted by C, and the content of the polyvinyl butyral resin with respect to the total amount of the ink composition is denoted by D. In this case, taking that the reduction of the wear of the ball socket 19a, the suppression of blur in handwriting, and an easy improvement of writing taste and the suppression of ink leakage in a well-balanced manner into consideration, the relationship of 0.1≤C/D≤10 is preferable. Taking it into more consideration, the relationship of 0.5≤C/D≤7 is preferable, and moreover the relationship of 1.5≤C/D≤5 is preferable.

When the total content of the resin is less than 1% by mass with respect to the total amount of the oil-based ballpoint pen ink composition, desired writing taste, the wear reduction of a ball socket, and ink leakage suppression performance tend to be poor. When the total content of the resin is more than 40% by mass, its solubility in the ink tends to be poor. Therefore, the total content of the resin is preferably in a range of 1% by mass to 40% by mass inclusive with respect to the total amount of the oil-based ballpoint pen ink composition. Taking it into further consideration, the total content of the resin is preferably 5% by mass or more. When the total content of the resin is more than 30% by mass, the ink viscosity becomes excessively high and tends to have an influence on the writing taste, and hence the total content of the resin is preferably in a range of 5% by mass to 30% by mass inclusive.

As a resin other than a ketone resin and a polyvinyl butyral resin, a stringiness imparting agent may be appropriately used. In particular, when a polyvinylpyrrolidone resin is blended, the ink has an enhanced binding property, whereby the occurrence of excess ink at the tip distal end is easily suppressed. Therefore, a polyvinylpyrrolidone resin is preferably contained. When the content of the polyvinylpyrrolidone resin is less than 0.01% by mass with respect to the total amount of the oil-based ballpoint pen ink composition, the occurrence of excess ink is prone to be difficult to suppress. When the content of the polyvinylpyrrolidone resin is more than 3.0% by mass, its solubility in the ink is prone to be poor. For this reason, the content of the polyvinylpyrrolidone resin is preferably in a range of 0.01% by mass to 3.0% by mass inclusive with respect to the total amount of the oil-based ballpoint pen ink composition. Taking the above reason into more consideration, the content of the polyvinylpyrrolidone resin is preferably in a range of 0.1% by mass to 2.0% by mass inclusive. Specific examples thereof include: trade name; PVP K-15, PVP K-30, PVP K-90, and PVP K-120 manufactured by ISP Japan Ltd. These may be used alone or in combination of two or more.

(Surfactant)

In the present invention, with respect to the lubricity, a surfactant is preferably used in view of reducing the wear of the ball socket 19a suppressing blur in handwriting, and improving writing taste as well as the start of writing performance at the time when the tip distal end portion is dried in a state where the tip distal end portion is left in the atmosphere. This is because when a surfactant is used, the coating film to be formed tends to be softened, the start of writing performance can be improved, and the lubricity can also be enhanced. Examples of the surfactant include unsaturated fatly acids, silicone-based surfactants, fluorine-based surfactants, and phosphoric acid ester-based surfactants (other than the phosphoric acid esters having $C_1H_{22H-1}O—C_2H_4O$ or $C_mH_{2m+1}O$ (1, m=1 to 30 inclusive)).

Among them, taking the above-mentioned effects into consideration, it is preferable to use one or more from among the unsaturated fatty acid, the silicone-based surfactant, and the phosphoric acid ester-based surfactant (other than the phosphoric acid esters having $C_1H_{22H-1}O—C_2H_4O$ or $C_mH_{2m+1}O$ (1, m=1 to 30 inclusive)), and it is more preferable to use two or more thereof.

In particular, the phosphoric acid ester used in the present invention has an excellent compatibility with a phosphoric acid ester-based surfactant (other than the phosphoric acid esters having $C_1H_{22H-1}O—C_2H_4O$ or $C_mH_{2m+1}O$ (1, m=1 to 30 inclusive)) since a phosphoric acid is included as the same skeleton, whereby a synergistic lubricating effect are easily obtained. Therefore, a phosphoric acid ester-based surfactant is preferably used. When the phosphoric acid ester is used together with a, phosphoric acid ester-based surfactant (other than the phosphoric acid esters having $C_1H_{22H-1}O—C_2H_4O$ or $C_mH_{2m+1}O$ (1, m=1 to 30 inclusive)), the lubricating layer of the phosphoric acid ester and the lubricating layer of the phosphoric acid ester-based surfactant interact with each other. This interaction enables to form a lubricating layer having higher lubricity. For this reason, it is expected that there can be achieved an effect of maintaining the lubricity, reducing the wear of the ball socket 19a, and making it easier to suppress blur in handwriting and to improve the writing taste.

Moreover, when using a phosphoric acid ester-based surfactant (other than the phosphoric acid esters having $C_1H_{22H-1}O—C_2H_4O$ Or $C_mH_{2m+1}O$ (1, m=1 to 30 inclusive)), the acid value is preferably 160 (mgKOH/g) or less. This is for making it easier to demonstrate an improvement of lubricity by the phosphoric acid ester-based surfactant, and taking its stability in the ink and its lubricity into further consideration, the acid value is preferably in a range of 30 (mgKOH/g) to 160 (mgKOH/g) inclusive. Taking it into more consideration, the acid value is preferably in a range of 70 (mgKOH/g) to 120 (mgKOH/g) inclusive.

Note that the acid value is represented by the number of milligrams of potassium hydroxide required to neutralize acid components contained in one gram of a sample.

Moreover, it is more preferable to use the above-mentioned saturated fatty acid, ketone resin, and polyvinyl butyral resin since the lubricity is easily further improved.

Taking further improvement of both lubricity and the start of writing performance into consideration, the surfactant is preferable to have an HLB value that is in a range of 6 to 14 inclusive. This is because when the HLB value is more than 14, its hydrophilicity tends to be strong, the solubility in the oil-based ink is prone to be poor, the effect of the surfactant is less likely to obtain, and the lubricating effect is difficult to obtain. This is also because, when the HLB value is less than 6, its lipophilicity becomes too strong, there is likely to be an influence on the miscibility with an organic solvent, the ink is less likely to be stabilized over time, and the start of writing performance is difficult to improve. Moreover, taking lubricity into consideration, the HLB value is preferably 12 or less, and the HLB value is preferably in a range of 6 to 12 inclusive, taking the start of writing performance into more consideration, the HLB value is preferably in a range of 7 to 12 inclusive.

Note that the HLB can be determined by a Griffin method, a Kawakami method, or the like. As an example, the HLB can be determined by a general formula such as HLB 7+11.7 log (Mw/Mo), (Mw; Molecular weight of the hydrophilic group, Mo; Molecular weight of the lipophilic group). In particular, the pen nib is always in a state of being exposed to the outside in retractable writing instruments such as a push-action writing instrument or a rotating retractable-type writing instrument, unlike in cap-type writing instruments, and hence there is likely to be an influence on the start of writing performance at the time when the writing distal end portion is dried, therefore it is more preferable to use a surfactant having the above-mentioned HIM value.

Specific examples of the surfactant include unsaturated fatty acids such as oleic acid, stearic acid, and linoleic acid. Examples of the silicone-based surfactant include dimethyl silicone, methyl phenyl silicone, polyether-modified silicone, and higher fatty acid ester-modified silicone. Examples of the fluorine-based surfactant include perfluoro group butyl sulfonate, perfluoro group-containing carboxylate, perfluoro group-containing phosphoric acid ester, perfluoro group-containing phosphoric acid ester type compound, perfluoroalkyl betaine, and perfluoroalkylainine oxide compound.

Examples of the phosphoric acid ester-based surfactant (other than the phosphoric acid esters having $C_1H_{22H-1}O$—$C_2H_4O$ or $C_mH_{2m+1}O$ (1, m=1 to 30)) include: phosphoric acid monoester of polyoxyethylene alkyl ether or of polyoxyethylene alkyl aryl ether; phosphoric acid diesters of polyoxyethylene alkyl ether or of polyoxyethylene alkyl aryl ether; phosphoric acid triesters of polyoxyethylene alkyl ether or of polyoxyethylene alkyl aryl ether; alkyl phosphoric acid ester; alkyl ether phosphoric acid ester; and derivatives thereof.

The content of the surfactant is more preferably in a range of 0.1% by mass to 5.0% by mass inclusive with respect to the total amount of the oil-based ballpoint pen ink composition. This is because when the content is less than 0.1% by mass, desired lubricity tends to be difficult to obtain, and when the content is more than 5.0% by mass, the ink tends to be unstable over time. Taking these tendencies into consideration, the content is preferably in a range of 0.3% by mass to 3.0% by mass inclusive with respect to the total amount of the oil-based ballpoint pen ink composition, and taking it into more consideration, the content is preferably in a range of 0.5% by mass to 3.0% by mass inclusive with respect to the total amount of the oil-based ballpoint pen ink composition.

(Fatty Acid Ester)

In the present invention, a fatty acid ester is preferably used in view of further improvement of the lubricity and the start of writing performance at the time when the tip distal end portion 13 is dried in a state where the tip distal end portion 13 is left in the atmosphere. The fatty acid ester is used to make it easier to soften the strength of a coating film formed when the ink at the tip distal end portion 13 is dried, whereby the start of writing performance is easily improved. Moreover, this is preferable since by making it easier to improve the lubricity, the wear of the ball socket 19a is reduced, and the suppression of blur in handwriting, the writing taste and the start of writing performance are all easily improved. Therefore, when the saturated fatty acid and the phosphoric acid ester having $C_1H_{22H-1}O$—$C_2H_4O$ or $C_mH_{2m+1}O$ (1, m=1 to 30) are used together with the fatty acid ester, a high lubricity that has not been conventionally obtained can be easily obtained owing to a lubricating effect by an interaction with a lubricating layer to be formed. That is, this is preferable since the wear reduction of the ball socket 19a, the writing taste, and the start of writing performance are all easily improved in a well-balanced manner.

The fatty acid ester is a product of the esterification reaction of a fatty acid with an alcohol such as a monohydric alcohol or a polyhydric alcohol. Among the fatty acid esters, taking further improvement of the start of writing performance into consideration, a fatty acid ester having a branched alkyl group is preferably used. This is because the fatty acid ester including a branched alkyl group has a bulkier structure than that of the fatty acid ester including a linear structure. This is because when the fatty acid ester is adsorbed on the surface of a metal ball or the ball socket of the tip main body, a thick lubricating film is created by the bulkiness of the branched alkyl group, so that the lubricity is easily improved. This is also because the strength of a coating film, which is formed when the ink at the tip distal end portion 13 is dried, is softened by the bulkiness of the branched alkyl group at the same time, so that the start of writing performance is improved.

Moreover, the fatty acid ester preferably has an acid value that is in a range of 001 (mgKOH/g) to 5 (mgKOH/g) inclusive. This is because it has a good compatibility with the methyl-branched fatty acid, the phosphoric acid ester, and other components in the oil-based ballpoint pen ink composition. Since the components remain stable in the ink for a long period of time, the start of writing performance and lubricity are improved for a long period of time, which makes it easier to improve the writing taste. Taking it into more consideration, the acid value is preferably in a range of 0.01 (mgKOH/g) to 2.5 (mgKOH/g) inclusive, and more preferably in a range of 0.05 (mgKOH/g) to 1.0 (mgKOH/g) inclusive.

Note that the acid value is represented by the number of milligrams of potassium hydroxide required to neutralize acid components (free fatty acids) contained in one gram of a sample.

The alcohol used in the esterification reaction of the fatty acid ester is preferably a polyhydric alcohol. Although the reason for this is not clear, it is expected that the larger the number of hydroxyl groups in the alcohol used in the esterification reaction of the fatty acid ester, the more likely a moisturizing effect is elicited. Therefore, it is expected that the strength of the coating film, which is formed when the tip distal end portion 13 is dried, is softened, whereby an effect of making the rotation of the ball 20 smooth is produced, so that the start of writing performance is improved without the occurrence of blur in handwriting. Taking a further improvement of the start of writing performance and lubricity into consideration, a polyhydric alcohol preferably has three or more hydroxyl groups, and more preferably it has five or more hydroxyl groups. In contrast, when a polyhydric alcohol has too many number of hydroxyl groups, there is likely to be an influence on the stability in the oil-based ink, and therefore a polyhydric alcohol preferably has eight or less hydroxyl groups, more preferably it has six or less hydroxyl groups.

Specific examples of the alcohol used in the esterification reaction of the fatty acid ester include: monohydric alcohols such as pentanol, cyclohexanol, hexanol, heptanol, octanol, 2-ethylhexanol, nonanol, isononanol, decanol, lauryl alcohol, myristyl alcohol, stearyl alcohol, and docosanol. Examples of the polyhydric alcohol include: ethylene glycol, propylene glycol, polyalkylene glycol, 1,3-propanediol, diethylene glycol, glycerin, 2-methylpropanetriol, neopentyl glycol, trimethylolethane, triethylolethane, trimethylolpropane, pentaerythritol, dipentaerythritol, and tripentaerythritol. Among them, taking further improvement of the start of writing performance and ink stability over time into consideration, a fatty acid ester esterified with a type of pentaerythritol such as pentaerythritol, dipentaerythritol, or tripentaerythritol is preferably contained, and taking them into more consideration, a fatty acid ester esterified with dipentaerythritol is preferably contained.

Note that, as other components, a pseudoplasticizer such as a fatty acid amide or a hydrogenated castor oil may be appropriately used as a viscosity modifier, and a colorant stabilizer, a plasticizer, a chelating agent, water or the like may be appropriately used. These may be used alone or in combination of two or more thereof.

As described above, the ink viscosity of the oil-based ballpoint pen ink composition of the present embodiment is in the range of 500 mPa; s to 15000 mPa·s inclusive at 20° C. and a shear rate of 500 sec' (during writing).

When the ink viscosity is more than 15000 mPa·s, the ball rotation resistance while writing is increased, the writing taste is likely to be heavy, there is likely to be an influence on the wear reduction of the ball socket 19a, and moreover the start of writing performance and the ink followability are prone to be impacted. For this reason, the ink viscosity at 20° C. and a shear rate of 500 sec$^{-1}$ (during writing) is preferably 15000 mPa·s or less. Taking an improvement of writing taste and the wear reduction of the ball socket 19a into more consideration, the ink viscosity is preferably 10,000 mPa·s or less; taking the writing taste and the wear reduction of the ball socket 19a into more consideration, the ink viscosity is preferably 8000 mPa·s or less; and moreover taking the writing taste into consideration, the ink viscosity is preferably 6000 mPa·s or less.

Incidentally, when the ink viscosity at 20° C. and a shear rate of 500 sec$^{-1}$ (during writing) is less than 10 mPa·s, there is likely to be an influence on the wear reduction of the ball socket 19a, and an effect of bleeding or ink sagging is prone to appear in handwriting. For this reason, the ink viscosity at 20° C. and a shear rate of 500 sec$^{-1}$ (during writing) is preferably 10 mPa·s or more, taking them into more consideration, the ink viscosity is preferably 100 mPa·s or more, and moreover taking the wear reduction of the ball socket 19a into consideration, the ink viscosity is preferably 500 mPa·s or more, and taking it into more consideration, the ink viscosity is preferably 1000 mPa's or more, and is preferably 2000 mPa·s or more.

EXAMPLES

Hereinafter, the present invention will be specifically described with reference to Examples. However, the present invention is not limited to the following Examples.

The oil-based ballpoint pen ink composition of Example 1 was prepared as follows. A pigment and a pigment dispersant were added to an organic solvent, and the mixture was dispersed with a disperser, followed by the addition of a pigment dispersion, a dye, an organic solvent, a polyvinyl butyral resin, a ketone resin, a phosphoric acid ester, an organic amine, a surfactant, a fatty acid ester, and a stringiness imparting resin, and predetermined amounts thereof were weighed and heated to 60° C. After this heating, the mixture was completely dissolved with a dispersion stirrer to prepare an oil-based ballpoint pen ink composition. Specific blending quantities are as described below.

Example 1

Colorant (a salt-forming dye of an acid dye and a basic dye): 10.0% by mass

Colorant (a salt-forming dye of a basic dye and an organic acid): 5.0% by mass

Pigment dispersion (a diketopyrrolopyrrole-based pigment having a pigment content of 20%): 15.0% by mass Saturated fatty acid (methyl branched octadecanoic acid (having 18 carbon atoms): 2.0% by mass Phosphoric acid ester having $C_1H_{22H-1}O$—$C_2H_4O$ or $C_mH_{2m+1}O$ (Chemical Formula 1: a mixture of n=1 and n=2 with I=4): 2.0% by mass Alcohol solvent (benzyl alcohol): 25.0% by mass Glycol ether solvent (ethylene glycol monophenyl ether): 19.5% by mass Surfactant (a phosphoric acid ester-based surfactant): 2.0% by mass Organic amine: 2.0% by mass Fatty acid ester (Acid value: 0.1 mgKOH/g, with six hydroxyl groups): 2.0% by mass Polyvinyl butyral resin (the amount of hydroxyl group: 36% by mole): 5.0% by mass Ketone resin (a ketone resin having an aromatic ring): 10.0% by mass Stringiness imparting resin (a polyvinyl pyrrolidone resin): 0.5% by mass In Example 1, 0.3 g of the oil-based ballpoint pen ink composition prepared with the above-mentioned blending quantities was directly filled into an ink reservoir cylinder 22 (made of polypropylene) of a ballpoint pen 1 illustrated in FIGS. 1 to 3 to prepare a ballpoint pen 1 of Example 1.

Note that a ballpoint pen refill 4 of the ballpoint pen 1 used in Example 1 had the following specifications.

Ball 20: a tungsten carbide ball 20 having a nominal diameter a of 0.3 mm

Tip main body 12: prepared by cutting into a desired length of a stainless steel wire rod having a nominal diameter p of 2.3 mm and a hardness of 230 Hv to 280 Hv.

Pressing load of coil spring 21: 8 gf/mm

Holding force for the ball 20: 300 gf

Travel of the ball 20 in the extending direction X: 18 μm
Arithmetic mean roughness (Ra) of the ball surface of the ball 20: 2 nm.
First inclination angle α: 90 degrees
Second inclination angle β: 120 degrees
Angle γ of bottom wall 19 of ball holding chamber 15: 120°
Appearance of the ball U protruding from the tip distal end portion 13 in a state where the ball 20 is placed on bottom wall 19: 30% of the ball diameter
Backward angle δ of the tip distal end portion 1
Clearance of the ball 20 in extending direction X: 18 μm In Example 1, the ballpoint pen refill 4 in the above-mentioned specifications was disposed in an oil-based ballpoint pen manufactured by PILOT CORPORATION to prepare the ballpoint pen 1 described with reference to FIGS. 1 to 3.

Examples 2 to 36

Oil-based ballpoint pen ink compositions for Examples 2 to 36 were produced by blending in the same procedure as in Example 1 except that various components were changed as shown in the tables. Note that, in Examples 2 to 36 there was used a ballpoint pen 1 having the same specifications as in Example 1 other than that different oil-based ballpoint pen ink compositions were used.

Comparative Examples 1 to 2

The oil-based ballpoint pen ink compositions with the blending shown in the table were used. Specifically, the oil-based ballpoint pen ink composition that is the same as in Example 1 was used in Comparative Example 1, and the oil-based ballpoint pen ink composition that is the same as in Example 33 was used in Comparative Example 2, Moreover, with use of the oil-based ballpoint pen ink composition, as a comparative ballpoint pen for each of Comparative Example 1 and Comparative Example 2, there was prepared a ballpoint pen 1 in the same specifications as those of Examples other than that the second inclination angle β was 150 degrees, the angle γ of the bottom wall 19 of the ball holding chamber 15 was 120 degrees, and the second inclination angle β and the angle γ were different from each other.

Note that the ink viscosities of the oil-based ballpoint pen ink compositions used in Examples 1 to 33 and Comparative Example 1, as measured with a viscometer RVDVII+ Pro CP-52 spindle manufactured by Brookfield. Inc., were in the range of 500 mPa·s to 15000 mPa·s inclusive under an environment of 20° C. at a shear rate of 500 sec.

Specifically, the oil-based ballpoint pen ink composition used in each of Examples and Comparative Examples had the following ink viscosity under an environment of 20° C. and at a shear rate of 500 $\sec^{-1}$.

Examples 1 to 2: Ink viscosity=4500 mPa·s
Example 13: Ink viscosity=3700 mPa·s
Examples 19 to 20: ink viscosity=2800 mPa·s
Example 21: Ink viscosity=4300 mPa·s
Example 23: Ink viscosity=3500 mPa·s
Example 29: Ink viscosity=5900 mPa·s
Example 30: Ink viscosity=7100 mPa·s
Example 31: Ink viscosity=1500 mPa·s Test and Evaluation The following tests and evaluations for the ballpoint pens 1 prepared in Examples 1 to 33 and the comparative ballpoint pens prepared in Comparative Example 1 were conducted with use of the writing paper in accordance with JIS P 3201 as writing test paper.

The measurement and evolution results are shown in the tables.

TABLE 1

| | | | Examples | | | | | | | |
|---|---|---|---|---|---|---|---|---|---|---|
| | | | Ex. 1 | Ex. 2 | Ex. 3 | Ex. 4 | Ex. 5 | Ex. 6 | Ex. 7 | Ex. 8 |
| Colorant | (1) | Salt-forming dye of azomethine-based basic dye and alkylbenzenesulfonic acid | 10.0 | 10.0 | 10.0 | 10.0 | 10.0 | 10.0 | 10.0 | 10.0 |
| | (2) | Salt-forming dye of xanthene-based basic dye and alkylbenzenesulfonic acid | 5.0 | 5.0 | 5.0 | 5.0 | 5.0 | 5.0 | 5.0 | 5.0 |
| | (1) | Salt-forming dye of copper phthalocyanine-based acid dye and aromatic amine | | | | | | | | |
| | (1) | Salt-forming dye of azo-based acid dye and aromatic amine | | | | | | | | |
| Pigment | | Pigment dispersion (diketopyrrolopyrrole-based pigment: a pigment content of 20%, average particle size of 250 nm) | 15.0 | 15.0 | 15.0 | 15.0 | 15.0 | 15.0 | 15.0 | 15.0 |
| Alcohol solvent | | Benzyl alcohol | 25.0 | 26.0 | 23.5 | 22.0 | 26.5 | 25.5 | 25.5 | 25.5 |
| Glycol ether solvent | | Ethylene glycol monophenyl ether | 19.5 | 20.0 | 20.0 | 20.0 | 20.0 | 20.0 | 20.0 | 20.0 |
| | (3) | Methyl branched octadecanoic acid (having 18 carbon atoms) | 2.0 | 1.5 | 3.0 | 2.0 | 2.0 | | | |
| Branched saturated fatty acid | (4) | Branched octadecanoic acid (Isostearic acid having 18 carbon atoms, not methyl-branched) | | | | | | 2.0 | | |
| | (4) | Branched icosanoic acid (Isoarachic acid having 20 carbon atoms, not methyl-branched) | | | | | | | 2.0 | |
| | (4) | Branched hexadecanoic acid (Isopalmitic acid having 16 carbon atoms, not methyl-branched) | | | | | | | | 2.0 |
| Linear saturated fatty acid | | Octadecanoic acid (stearic acid having 18 carbon atoms) | | | | | | | | |
| Unsaturated fatty acid | (5) | cis-9-octadecenoic acid (oleic acid having 18 carbon atoms) | | | | | | | | |

TABLE 1-continued

| | | | Examples | | | | | | | |
|---|---|---|---|---|---|---|---|---|---|---|
| | | | Ex. 1 | Ex. 2 | Ex. 3 | Ex. 4 | Ex. 5 | Ex. 6 | Ex. 7 | Ex. 8 |
| Phosphoric acid ester having $C_lH_{2l+1}O\text{—}C_2H_4O$ or $C_mH_{2m+1}O$ (l, m = 1 to 30) | (6) | Mixture of monoester of butoxyethyl acid phosphate (Chemical Formula 1: l = 4, n = 1) and diester of butoxyethyl acid phosphate (Chemical Formula 1: l = 4, n = 2) 2-hexyl acid phosphate (Chemical Formula 2: m = 4) Oleyl acid phosphate (Chemical Formula 2: m = 8) Butyl acid phosphate (Chemical Formula 2: m = 18) | 2.0 | 2.0 | 2.0 | 1.5 | 3.0 | 2.0 | 2.0 | 2.0 |
| Surfactant | (7) | Phosphoric acid ester-based surfactant | 2.0 | 1.0 | | 1.0 | 1.0 | 1.0 | 1.0 | 1.0 |
| | (8) | Phosphoric acid ester-based surfactant | | | 2.0 | | | | | |
| Organic amine | (9) | Oxyethylene alkylamine (secondary amine) | 2.0 | 2.0 | 2.0 | 1.0 | 2.0 | 2.0 | 2.0 | 2.0 |
| | (15) | Dimethylalkylamine (tertiary amine) | | | | | | | | |
| Fatty acid ester | (10) | Fatty acid ester esterified with a fatty acid and dipentaerythritol (containing branched alkyl group, Acid value: 0.1 mgKOH/g, with six hydroxyl groups) | 2.0 | 2.0 | 2.0 | 2.0 | 2.0 | 2.0 | 2.0 | 2.0 |
| | (11) | Fatty acid ester esterified with a fatty acid and trimethylolpropane (containing branched alkyl group, Acid value: 0.1 mgKOH/g, with three hydroxyl groups) | | | | | | | | |
| Resin | (12) | Polyvinyl butyral resin (the amount of hydroxyl group: 36% by mole, average degree of polymerization: 300) | 5.0 | 5.0 | 5.0 | | 5.0 | 5.0 | 5.0 | 5.0 |
| | (12) | Polyvinyl butyral resin (the amount of hydroxyl group: 30% by mole, average degree of polymerization: 1300) | | | | | 5.0 | | | |
| | (13) | Ketone resin (hydroxyl value: 110 (mgKOH/g) or more and 130 (mgKOH/g) or less, a ketone resin having an acetophenone group) | 10.0 | 10.0 | 10.0 | 10.0 | 8.0 | 10.0 | 10.0 | 10.0 |
| | (13) | Ketone resin (hydroxyl value: 310 (mgKOH/g) or more and 330 (mgKOH/g) or less, a ketone resin having a cyclohexane group) | | | | | | | | |
| Stringiness imparting resin | (14) | (16) Polyvinylpyrrolidone resin | 0.5 | 0.5 | 0.5 | 0.5 | 0.5 | 0.5 | 0.5 | 0.5 |
| | | Total | 100.0 | 100.0 | 100.0 | 95.0 | 100.0 | 100.0 | 100.0 | 100.0 |
| | | Ball diameter (mm) | 0.3 | 0.3 | 0.3 | 0.3 | 0.3 | 0.3 | 0.3 | 0.3 |
| | | Arithmetic mean roughness (Ra) of the ball surface (nm) | 2 | 2 | 2 | 2 | 2 | 2 | 2 | 2 |
| | | Travel of the ball of the ballpoint pen tip in the longitudinal direction (μm) | 18 | 18 | 18 | 18 | 18 | 18 | 18 | 18 |
| | | X/Y, wherein X is the total content of the saturated fatty acid with respect to the total amount of the ink composition, and Y is the content of the phosphoric acid ester having $C_lH_{2l+1}O\text{—}C_2H_4O$ or $C_mH_{2m+1}O$ (l, m = 1 or more and 30 or less) with respect to the total amount of the ink composition | 1.0 | 0.8 | 1.5 | 1.3 | 0.7 | 1.0 | 1.0 | 1.0 |
| | | C/D, wherein C is the content of the ketone resin with respect to the total amount of the ink composition, and D is the content of the polyvinyl butyral resin with respect to the total amount of the ink composition | 2.0 | 2.0 | 2.0 | 2.0 | 1.6 | 2.0 | 2.0 | 2.0 |
| Evaluation | | Ink flow rate stability test | ◯ | ◯ | ◯ | ◯ | ◯ | ◯ | ◯ | ◯ |
| | | Writing test to check paper contact | ◯ | ◯ | ◯ | ◯ | ◯ | ◯ | ◯ | ◯ |
| | | Wear resistance test (abrasion test for ball socket) | ◎ | ◎ | ◎ | ◎ | ◎ | ◯ | ◯ | ◯ |
| | | Writing taste | ◎ | ◎ | ◎ | ◎ | ◎ | ◎ | ◎ | ◎ |
| | | Start of writing performance test | ◎ | ◎ | ◉◎ | ◎ | ◎ | ◎ | ◎ | ◎ |
| | | Ink aging test | ◎ | ◎ | ◉◎ | ◎ | ◎ | ◎ | ◎ | ◎ |

TABLE 2

| | | | Examples | | | | | | | |
|---|---|---|---|---|---|---|---|---|---|---|
| | | | Ex. 9 | Ex. 10 | Ex. 11 | Ex. 12 | Ex. 13 | Ex. 14 | Ex. 15 | Ex. 16 |
| Colorant | (1) | Salt-forming dye of azomethine-based basic dye and alkylbenzenesulfonic acid | 10.0 | 10.0 | 15.0 | | 10.0 | 10.0 | 10.0 | 10.0 |
| | (2) | Salt-forming dye of xanthene-based basic dye and alkylbenzenesulfonic acid | 5.0 | 5.0 | | 15.0 | 5.0 | 5.0 | 5.0 | 5.0 |
| | (1) | Salt-forming dye of copper phthalocyanine-based acid dye and aromatic amine | | | | | | | | |
| | (1) | Salt-forming dye of azo-based acid dye and aromatic amine | | | | | | | | |
| Pigment | | Pigment dispersion (diketopyrrolopyrrole-based pigment: a pigment content of 20%, average particle size of 250 nm) | 15.0 | 15.0 | 15.0 | 15.0 | 15.0 | 15.0 | 15.0 | 15.0 |

TABLE 2-continued

|  |  |  | Examples |  |  |  |  |  |  |  |
|---|---|---|---|---|---|---|---|---|---|---|
|  |  |  | Ex. 9 | Ex. 10 | Ex. 11 | Ex. 12 | Ex. 13 | Ex. 14 | Ex. 15 | Ex. 16 |
| Alcohol solvent |  | Benzyl alcohol | 25.5 | 25.5 | 25.5 | 25.5 | 27.5 | 28.5 | 20.5 | 25.5 |
| Glycol ether solvent |  | Ethylene glycol monophenyl ether | 20.0 | 20.0 | 20.0 | 20.0 | 20.0 | 20.0 | 20.0 | 20.0 |
| Branched saturated fatty acid | (3) | Methyl branched octadecanoic acid (having 18 carbon atoms) |  | 2.0 | 2.0 | 2.0 | 2.0 | 2.0 | 2.0 | 2.0 |
|  | (4) | Branched octadecanoic acid (Isostearic acid having 18 carbon atoms, not methyl-branched) |  |  |  |  |  |  |  |  |
|  | (4) | Branched icosanoic acid (Isoarachic acid having 20 carbon atoms, not methyl-branched) |  |  |  |  |  |  |  |  |
|  | (4) | Branched hexadecanoic acid (Isopalmitic acid having 16 carbon atoms, not methyl-branched) |  |  |  |  |  |  |  |  |
| Linear saturated fatty acid |  | Octadecanoic acid (stearic acid having 18 carbon atoms) | 2.0 |  |  |  |  |  |  |  |
| Unsaturated fatty acid | (5) | cis-9-octadecenoic acid (oleic acid having 18 carbon atoms) |  |  |  |  |  |  |  |  |
| Phosphoric acid ester having $C_lH_{2l+1}O$—$C_2H_4O$ or $C_mH_{2m+1}O$ (l, m = 1 to 30) | (6) | Mixture of monoester of butoxyethyl acid phosphate (Chemical Formula 1: l = 4, n = 1) and diester of butoxyethyl acid phosphate (Chemical Formula 1: l = 4, n = 2) | 2.0 |  |  | 2.0 | 2.0 | 2.0 | 2.0 | 2.0 |
|  |  | 2-hexyl acid phosphate (Chemical Formula 2: m = 4) |  | 2.0 |  |  |  |  |  |  |
|  |  | Oleyl acid phosphate (Chemical Formula 2: m = 8) |  |  | 2.0 |  |  |  |  |  |
|  |  | Butyl acid phosphate (Chemical Formula 2: m = 18) |  |  |  |  |  |  |  |  |
| Surfactant | (7) | Phosphoric acid ester-based surfactant | 1.0 | 1.0 | 1.0 | 1.0 | 1.0 | 1.0 | 1.0 | 1.0 |
|  | (8) | Phosphoric acid ester-based surfactant |  |  |  |  |  |  |  |  |
| Organic amine | (9) | Oxyethylene alkylamine (secondary amine) | 2.0 | 2.0 | 2.0 | 2.0 | 2.0 | 2.0 | 2.0 | 2.0 |
|  | (15) | Dimethylalkylamine (tertiary amine) |  |  |  |  |  |  |  |  |
| Fatty acid ester | (10) | Fatty acid ester esterified with a fatty acid and dipentaerythritol (containing branched alkyl group, Acid value: 0.1 mgKOH/g, with six hydroxyl groups) | 2.0 | 2.0 | 2.0 | 2.0 | 2.0 | 2.0 | 2.0 | 2.0 |
|  | (11) | Fatty acid ester esterified with a fatty acid and trimethylolpropane (containing branched alkyl group, Acid value: 0.1 mgKOH/g, with three hydroxyl groups) |  |  |  |  |  |  |  |  |
| Resin | (12) | Polyvinyl butyral resin (the amount of hydroxyl group: 36% by mole, average degree of polymerization: 300) | 5.0 | 5.0 | 5.0 | 5.0 | 3.0 | 5.0 | 5.0 | 5.0 |
|  | (12) | Polyvinyl butyral resin (the amount of hydroxyl group: 30% by mole, average degree of polymerization: 1300) |  |  |  |  |  |  |  |  |
|  | (13) | Ketone resin (hydroxyl value: 110 (mgKOH/g) or more and 130 (mgKOH/g) or less, a ketone resin having an acetophenone group) | 10.0 | 10.0 | 10.0 | 10.0 | 10.0 | 7.0 |  | 10.0 |
|  | (13) | Ketone resin (hydroxyl value: 310 (mgKOH/g) or more and 330 (mgKOH/g) or less, a ketone resin having a cyclohexane group) |  |  |  |  |  |  | 15.0 |  |
| Stringiness imparting resin | (14) | (16) Polyvinylpyrrolidone resin | 0.5 | 0.5 | 0.5 | 0.5 | 0.5 | 0.5 | 0.5 | 0.5 |
|  |  | Total | 100.0 | 100.0 | 100.0 | 100.0 | 100.0 | 100.0 | 100.0 | 100.0 |
|  |  | Ball diameter (mm) | 0.3 | 0.3 | 0.3 | 0.3 | 0.3 | 0.3 | 0.3 | 0.3 |
|  |  | Arithmetic mean roughness (Ra) of the ball surface (nm) | 2 | 2 | 2 | 2 | 2 | 2 | 2 | 2 |
|  |  | Travel of the ball of the ballpoint pen tip in the longitudinal direction (μm) | 18 | 18 | 18 | 18 | 18 | 18 | 18 | 12 |
|  |  | X/Y, wherein X is the total content of the saturated fatty acid with respect to the total amount of the ink composition, and Y is the content of the phosphoric acid ester having $C_lH_{2l+1}O$—$C_2H_4O$ or $C_mH_{2m+1}O$ (l, m = 1 or more and 30 or less) with respect to the total amount of the ink composition | 1.0 | 1.0 | 1.0 | 1.0 | 1.0 | 1.0 | 1.0 | 1.0 |
|  |  | C/D, wherein C is the content of the ketone resin with respect to the total amount of the ink composition, and D is the content of the polyvinyl butyral resin with respect to the total amount of the ink composition | 2.0 | 2.0 | 2.0 | 2.0 | 3.3 | 1.4 | 3.0 | 2.0 |
| Evaluation |  | Ink flow rate stability test | ○ | ○ | ○ | ○ | ○ | ○ | ○ | ○ |
|  |  | Writing test to check paper contact | ○ | ○ | ○ | ○ | ○ | ○ | ○ | ○ |
|  |  | Wear resistance test (abrasion test for ball socket) | Δ | ○ | ○ | Δ | ◎ | ○ | ○ | ○ |
|  |  | Writing taste | ○ | ○ | ○ | ○ | ◎ | ○ | Δ | ○ |
|  |  | Start of writing performance test | ◎ | ◎ | ◎ | ◎ | ◎ | ◎ | ○ | ◎ |
|  |  | Ink aging test | ◎ | ◎ | ◎ | ○ | ◎ | ◎ | ○ | ◎ |

TABLE 3

| | | | Examples | | | | | | | |
|---|---|---|---|---|---|---|---|---|---|---|
| | | | Ex. 17 | Ex. 18 | Ex. 19 | Ex. 20 | Ex. 21 | Ex. 22 | Ex. 23 | Ex. 24 |
| Colorant | (1) | Salt-forming dye of azomethine-based basic dye and alkylbenzenesulfonic acid | 10.0 | 10.0 | | | | | | |
| | (2) | Salt-forming dye of xanthene-based basic dye and alkylbenzenesulfonic acid | 5.0 | 5.0 | | | | | | |
| | (1) | Salt-forming dye of copper phthalocyanine-based acid dye and aromatic amine | | | 10.0 | 10.0 | 10.0 | 10.0 | 10.0 | 10.0 |
| | (1) | Salt-forming dye of azo-based acid dye and aromatic amine | | | 5.0 | 5.0 | 5.0 | 5.0 | 5.0 | 5.0 |
| Pigment | | Pigment dispersion (diketopyrrolopyrrole-based pigment: a pigment content of 20%, average particle size of 250 nm) | 15.0 | 15.0 | | | | | | |
| Alcohol solvent | | Benzyl alcohol | 25.5 | 25.5 | 42.0 | 42.0 | 35.5 | 40.5 | 34.5 | 40.5 |
| Glycol ether solvent | | Ethylene glycol monophenyl ether | 20.0 | 20.0 | 20.0 | 20.0 | 20.0 | 20.0 | 20.0 | 20.0 |
| Branched saturated fatty acid | (3) | Methyl branched octadecanoic acid (having 18 carbon atoms) | 2.0 | 2.0 | 2.0 | | 2.0 | 2.0 | 2.0 | 2.0 |
| | (4) | Branched octadecanoic acid (Isostearic acid having 18 carbon atoms, not methyl-branched) | | | | 2.0 | | | | |
| | (4) | Branched icosanoic acid (Isoarachic acid having 20 carbon atoms, not methyl-branched) | | | | | | | | |
| | (4) | Branched hexadecanoic acid (Isopalmitic acid having 16 carbon atoms, not methyl-branched) | | | | | | | | |
| Linear saturated fatty acid | | Octadecanoic acid (stearic acid having 18 carbon atoms) | | | | | | | | |
| Unsaturated fatty acid | (5) | cis-9-octadecenoic acid (oleic acid having 18 carbon atoms) | | | | | | | | |
| Phosphoric acid ester having $C_lH_{2l+1}O$—$C_2H_4O$ or $C_mH_{2m+1}O$ (l, m = 1 to 30) | (6) | Mixture of monoester of butoxyethyl acid phosphate (Chemical Formula 1: l = 4, n = 1) and diester of butoxyethyl acid phosphate (Chemical Formula 1: l = 4, n = 2) | 2.0 | 2.0 | 2.0 | 2.0 | 2.0 | 2.0 | 2.0 | 2.0 |
| | | 2-hexyl acid phosphate (Chemical Formula 2: m = 4) | | | | | | | | |
| | | Oleyl acid phosphate (Chemical Formula 2: m = 8) | | | | | | | | |
| | | Butyl acid phosphate (Chemical Formula 2: m = 18) | | | | | | | | |
| Surfactant | (7) | Phosphoric acid ester-based surfactant | 1.0 | | 0.5 | 0.5 | | | | |
| | (8) | Phosphoric acid ester-based surfactant | | 2.0 | | | 2.0 | 2.0 | 2.0 | 2.0 |
| Organic amine | (9) | Oxyethylene alkylamine (secondary amine) | 2.0 | 2.0 | 1.0 | 1.0 | 1.0 | 1.0 | 1.0 | 1.0 |
| | (15) | Dimethylalkylamine (tertiary amine) | | | | | | | | |
| Fatty acid ester | (10) | Fatty acid ester esterified with a fatty acid and dipentaerythritol (containing branched alkyl group, Acid value: 0.1 mgKOH/g, with six hydroxyl groups) | | | 1.0 | 2.0 | 2.0 | 2.0 | 2.0 | |
| | (11) | Fatty acid ester esterified with a fatty acid and trimethylolpropane (containing branched alkyl group, Acid value: 0.1 mgKOH/g, with three hydroxyl groups) | 2.0 | | | | | | | 2.0 |
| Resin | (12) | Polyvinyl butyral resin (the amount of hydroxyl group: 36% by mole, average degree of polymerization: 300) | 3.0 | 5.0 | 5.0 | 5.0 | 5.0 | 7.0 | 3.0 | |
| | (12) | Polyvinyl butyral resin (the amount of hydroxyl group: 30% by mole, average degree of polymerization: 1300) | | | | | | | | 5.0 |
| | (13) | Ketone resin (hydroxyl value: 110 (mgKOH/g) or more and 130 (mgKOH/g) or less, a ketone resin having an acetophenone group) | 12.0 | 10.0 | 10.0 | 10.0 | 15.0 | 8.0 | 18.0 | 10.0 |
| | (13) | Ketone resin (hydroxyl value: 310 (mgKOH/g) and 330 (mgKOH/g) or less, a ketone resin having a cyclohexane group) | | | | | | | | |
| Stringiness imparting resin | (14) | (16) Polyvinylpyrrolidone resin | 0.5 | 0.5 | 0.5 | 0.5 | 0.5 | 0.5 | 0.5 | 0.5 |
| | | Total | 100.0 | 100.0 | 100.0 | 100.0 | 100.0 | 100.0 | 100.0 | 100.0 |
| | | Ball diameter (mm) | 0.3 | 0.5 | 0.3 | 0.3 | 0.3 | 0.3 | 0.3 | 0.5 |
| | | Arithmetic mean roughness (Ra) of the ball surface (nm) | 2 | 5 | 2 | 2 | 2 | 2 | 2 | 5 |
| | | Travel of the ball of the ballpoint pen tip in the longitudinal direction (μm) | 24 | 15 | 18 | 18 | 18 | 18 | 18 | 15 |
| | | X/Y, wherein X is the total content of the saturated fatty acid with respect to the total amount of the ink composition, and Y is the content of the phosphoric acid ester having $C_lH_{2l+1}O$—$C_2H_4O$ or $C_mH_{2m+1}O$ (l, m = 1 or more and 30 or less) with respect to the total amount of the ink composition | 1.0 | 1.0 | 1.0 | 1.0 | 1.0 | 1.0 | 1.0 | 1.0 |
| | | C/D, wherein C is the content of the ketone resin with respect to the total amount of the ink composition, and D is the content of the polyvinyl butyral resin with respect to the total amount of the ink composition | 4.0 | 2.0 | 2.0 | 2.0 | 3.0 | 1.1 | 6.0 | 2.0 |
| Evaluation | | Ink flow rate stability test | ○ | ○ | ○ | ○ | ○ | ○ | ○ | ○ |
| | | Writing test to check paper contact | ○ | ○ | ○ | ○ | ○ | ○ | ○ | ○ |
| | | Wear resistance test (abrasion test for ball socket) | ◎ | ◎ | ◎ | ○ | ◎ | ○ | ◎ | ◎ |
| | | Writing taste | ◎ | ◎ | ◎ | ◎ | ◎ | ○ | ○ | ◎ |
| | | Start of writing performance test | ◎ | ◎ | ◎ | ◎ | ◎ | ◎ | ◎ | ◎ |
| | | Ink aging test | ◎ | ◎ | ◎ | ◎ | ◎ | ◎ | ◎ | ◎ |

TABLE 4

| | | | Examples | | | | | | | |
|---|---|---|---|---|---|---|---|---|---|---|
| | | | Ex. 25 | Ex. 26 | Ex. 27 | Ex. 28 | Ex. 29 | Ex. 30 | Ex. 31 | Ex. 32 |
| Colorant | (1) | Salt-forming dye of azomethine-based basic dye and alkylbenzenesulfonic acid | | 10.0 | 10.0 | 10.0 | 10.0 | 10.0 | | 10.0 |
| | (2) | Salt-forming dye of xanthene-based basic dye and alkylbenzenesulfonic acid | | 5.0 | 5.0 | 5.0 | 5.0 | 5.0 | | 5.0 |
| | (1) | Salt-forming dye of copper phthalocyanine-based acid dye and aromatic amine | 10.0 | | | | | | 10.0 | |
| | (1) | Salt-forming dye of azo-based acid dye and aromatic amine | 5.0 | | | | | | 5.0 | |
| Pigment | | Pigment dispersion (diketopyrrolopyrrole-based pigment: a pigment content of 20%, average particle size of 250 nm) | | 15.0 | 15.0 | 15.0 | 15.0 | 15.0 | | 15.0 |
| Alcohol solvent | | Benzyl alcohol | 33.9 | 26.0 | 24.8 | 25.0 | 25.5 | 24.3 | 44.0 | 27.5 |
| Glycol ether solvent | | Ethylene glycol monophenyl ether | 20.0 | 19.5 | 19.5 | 19.5 | 19.5 | 19.5 | 20.0 | 20.0 |
| Branched saturated fatty acid | (3) | Methyl branched octadecanoic acid (having 18 carbon atoms) | 2.0 | 2.0 | 1.2 | 2.0 | 2.0 | 2.0 | 2.0 | |
| | (4) | Branched octadecanoic acid (Isostearic acid having 18 carbon atoms, not methyl-branched) | | | | | | | | |
| | (4) | Branched icosanoic acid (Isoarachic acid having 20 carbon atoms, not methyl-branched) | | | | | | | | |
| | (4) | Branched hexadecanoic acid (Isopalmitic acid having 16 carbon atoms, not methyl-branched) | | | | | | | | |
| Linear saturated fatty acid | | Octadecanoic acid (stearic acid having 18 carbon atoms) | | | | | | | | |
| Unsaturated fatty acid | (5) | cis-9-octadecenoic acid (oleic acid having 18 carbon atoms) | | | | | | | | |
| Phosphoric acid ester having $C_lH_{2l+1}O$—$C_2H_4O$ or $C_mH_{2m+1}O$ (l, m = 1 to 30) | (6) | Mixture of monoester of butoxyethyl acid phosphate (Chemical Formula 1: l = 4, n = 1) and diester of butoxyethyl acid phosphate (Chemical Formula 1: l = 4, n = 2) | 2.0 | 2.0 | 2.0 | 2.0 | 2.0 | 2.0 | 2.0 | 2.0 |
| | | 2-hexyl acid phosphate (Chemical Formula 2: m = 4) | | | | | | | | |
| | | Oleyl acid phosphate (Chemical Formula 2: m = 8) | | | | | | | | |
| | | Butyl acid phosphate (Chemical Formula 2: m = 18) | | | | | | | | |
| Surfactant | (7) | Phosphoric acid ester-based surfactant | | 2.0 | 3.0 | 2.0 | 2.0 | 2.0 | 0.5 | 1.0 |
| | (8) | Phosphoric acid ester-based surfactant | 2.0 | | | | | | | |
| Organic amine | (9) | Oxyethylene alkylamine (secondary amine) | 1.0 | | 2.0 | | 2.0 | 2.0 | 1.0 | 2.0 |
| | (15) | Dimethylalkylamine (tertiary amine) | | 1.0 | | 2.0 | | | | |
| Fatty acid ester | (10) | Fatty acid ester esterified with a fatty acid and dipentaerythritol (containing branched alkyl group, Acid value: 0.1 mgKOH/g, with six hydroxyl groups) | 2.0 | 2.0 | 2.0 | 2.0 | 2.0 | 2.0 | 2.0 | 2.0 |
| | (11) | Fatty acid ester esterified with a fatty acid and trimethylolpropane (containing branched alkyl group, Acid value: 0.1 mgKOH/g, with three hydroxyl groups) | | | | | | | | |
| Resin | (12) | Polyvinyl butyral resin (the amount of hydroxyl group: 36% by mole, average degree of polymerization: 300) | 3.6 | 5.0 | 5.0 | 5.0 | 3.5 | 3.5 | 3.0 | 5.0 |
| | (12) | Polyvinyl butyral resin (the amount of hydroxyl group: 30% by mole, average degree of polymerization: 1300) | | | | | | | | |
| | (13) | Ketone resin (hydroxyl value: 110 (mgKOH/g) or more and 130 (mgKOH/g) or less, a ketone resin having an (acetophenone group) | 18.0 | 10.0 | 10.0 | 10.0 | 11.0 | 12.2 | 10.0 | 10.0 |
| | (13) | Ketone resin (hydroxyl value: 310 (mgKOH/g) or more and 330 (mgKOH/g) or less, a ketone resin having a cyclohexane group) | | | | | | | | |
| Stringiness imparting resin | (14) | (16) Polyvinylpyrrolidone resin | 0.5 | 0.5 | 0.5 | 0.5 | 0.5 | 0.5 | 0.5 | 0.5 |
| | | Total | 100.0 | 100.0 | 100.0 | 100.0 | 100.0 | 100.0 | 100.0 | 100.0 |
| | | Ball diameter (mm) | 0.3 | 0.3 | 0.4 | 0.4 | 0.3 | 0.3 | 0.3 | 0.3 |
| | | Arithmetic mean roughness (Ra) of the ball surface (nm) | 2 | 2 | 3 | 3 | 2 | 2 | 2 | 2 |
| | | Travel of the ball of the ballpoint pen tip in the longitudinal direction (μm) | 18 | 18 | 15 | 15 | 18 | 18 | 18 | 18 |
| | | X/Y, wherein X is the total content of the saturated fatty acid with respect to the total amount of the ink composition, and Y is the content of the phosphoric acid ester having $C_lH_{2l+1}O$—$C_2H_4O$ or $C_mH_{2m+1}O$ (l, m = 1 or more and 30 or less) with respect to the total amount of the ink composition | 1.0 | 1.0 | 0.6 | 1.0 | 1.0 | 1.0 | 1.0 | |
| | | C/D, wherein C is the content of the ketone resin with respect to the total amount of the ink composition, and D is the content of the polyvinyl butyral resin with respect to the total amount of the ink composition | 5.0 | 2.0 | 2.0 | 2.0 | 3.1 | 3.5 | 3.3 | 2.0 |
| Evaluation | | Ink flow rate stability test | ○ | ○ | ○ | ○ | ○ | ○ | ○ | ○ |
| | | Writing test to check paper contact | ○ | ○ | ○ | ○ | ○ | ○ | ○ | ○ |
| | | Wear resistance test (abrasion test for ball socket) | ◎ | ◎ | ◎ | ◎ | ○ | ○ | ◎ | X |
| | | Writing taste | ◎ | ◎ | ◎ | ◎ | ○ | Δ | ◎ | Δ |
| | | Start of writing performance test | ◎ | ◎ | ◎ | ◎ | ○ | Δ | ◎ | Δ |
| | | Ink aging test | ◎ | ○ | ◎ | ○ | ◎ | ◎ | ◎ | ○ |

TABLE 5

|  |  |  | Examples | | | | Comp. Ex. 1 | Comp. Ex. 2 |
|---|---|---|---|---|---|---|---|---|
|  |  |  | Ex. 33 | Ex. 34 | Ex. 35 | Ex. 36 |  |  |
| Colorant | (1) | Salt-forming dye of azomethine-based basic dye and alkylbenzenesulfonic acid | 10.0 |  |  | 10.0 | 10.0 | 10.0 |
|  | (2) | Salt-forming dye of xanthene-based basic dye and alkylbenzenesulfonic acid | 5.0 |  |  | 5.0 | 5.0 | 5.0 |
|  | (1) | Salt-forming dye of copper phthalocyanine-based acid dye and aromatic amine |  | 10.0 | 10.0 |  |  |  |
|  | (1) | Salt-forming dye of azo-based acid dye and aromatic amine |  | 5.0 | 5.0 |  |  |  |
| Pigment |  | Pigment dispersion (diketopyrrolopyrrole-based pigment: a pigment content of 20%, average particle size of 250 nm) | 15.0 |  |  | 15.0 | 15.0 | 15.0 |
| Alcohol solvent |  | Benzyl alcohol | 27.5 | 44.0 | 44.0 | 25.5 | 25.0 | 27.5 |
| Glycol ether solvent |  | Ethylene glycol monophenyl ether | 20.0 | 20.0 | 20.0 | 20.0 | 19.5 | 20.0 |
| Branched saturated fatty acid | (3) | Methyl branched octadecanoic acid (having 18 carbon atoms) | 2.0 |  |  |  | 2.0 | 2.0 |
|  | (4) | Branched octadecanoic acid (Isostearic acid having 18 carbon atoms, not methyl-branched) |  |  |  |  |  |  |
|  | (4) | Branched icosanoic acid (Isoarachic acid having 20 carbon atoms, not methyl-branched) |  |  |  |  |  |  |
|  | (4) | Branched hexadecanoic acid (Isopalmitic acid having 16 carbon atoms, not methyl-branched) |  |  |  |  |  |  |
| Linear saturated fatty acid |  | Octadecanoic acid (stearic acid having 18 carbon atoms) |  |  |  |  |  |  |
| Unsaturated fatty acid | (5) | cis-9-octadecenoic acid (oleic acid having 18 carbon atoms) |  |  |  | 2.0 |  |  |
| Phosphoric acid ester having $C_lH_{2l+1}O-C_2H_4O$ or $C_mH_{2m+1}O$ ($l, m = 1$ to $30$) | (6) | Mixture of monoester of butoxyethyl acid phosphate (Chemical Formula 1: $l = 4$, $n = 1$) and diester of butoxyethyl acid phosphate (Chemical Formula 1: $l = 4$, $n = 2$) |  | 2.0 | 2.0 | 2.0 | 2.0 |  |
|  |  | 2-hexyl acid phosphate (Chemical Formula 2: $m = 4$) |  |  |  |  |  |  |
|  |  | Oleyl acid phosphate (Chemical Formula 2: $m = 8$) |  |  |  |  |  |  |
|  |  | Butyl acid phosphate (Chemical Formula 2: $m = 18$) |  |  |  |  |  |  |
| Surfactant | (7) | Phosphoric acid ester-based surfactant | 1.0 | 0.5 | 0.5 | 1.0 | 2.0 | 1.0 |
|  | (8) | Phosphoric acid ester-based surfactant |  |  |  |  |  |  |
| Organic amine | (9) | Oxyethylene alkylamine (secondary amine) | 2.0 | 1.0 | 1.0 | 2.0 | 2.0 | 2.0 |
|  | (15) | Dimethylalkylamine (tertiary amine) |  |  |  |  |  |  |
| Fatty acid ester | (10) | Fatty acid ester esterified with a fatty acid and dipentaerythritol (containing branched alkyl group, Acid value: 0.1 mgKOH/g, with six hydroxyl groups) | 2.0 | 2.0 | 2.0 | 2.0 | 2.0 | 2.0 |
|  | (11) | Fatty acid ester esterified with a fatty acid and trimethylolpropane (containing branched alkyl group, Acid value: 0.1 mgKOH/g, with three hydroxyl groups) |  |  |  |  |  |  |
| Resin | (12) | Polyvinyl butyral resin (the amount of hydroxyl group: 36% by mole, average degree of polymerization: 300) | 5.0 | 5.0 | 5.0 | 5.0 | 5.0 | 5.0 |
|  | (12) | Polyvinyl butyral resin (the amount of hydroxyl group: 30% by mole, average degree of polymerization: 1300) |  |  |  |  |  |  |
|  | (13) | Ketone resin (hydroxyl value: 110 (mgKOH/g) or more and 130 (mgKOH/g) or less, a ketone resin having an acetophenone group) | 10.0 | 10.0 | 10.0 | 10.0 | 10.0 | 10.0 |
|  | (13) | Ketone resin (hydroxyl value: 310 (mgKOH/g) or more and 330 (mgKOH/g) or less, a ketone resin having a cyclohexane group) |  |  |  |  |  |  |
| Stringiness imparting resin | (14) | (16) Polyvinylpyrrolidone resin | 0.5 | 0.5 | 0.5 | 0.5 | 0.5 | 0.5 |
|  |  | Total | 100.0 | 100.0 | 100.0 | 100.0 | 100.0 | 100.0 |
|  |  | Ball diameter (mm) | 0.3 | 0.3 | 0.3 | 0.3 | 0.3 | 0.3 |
|  |  | Arithmetic mean roughness (Ra) of the ball surface (nm) | 2 | 2 | 2 | 2 | 2 | 2 |
|  |  | Travel of the ball of the ballpoint pen tip in the longitudinal direction (μm) | 18 | 18 | 18 | 18 | 18 | 18 |
|  |  | X/Y, wherein X is the total content of the saturated fatty acid with respect to the total amount of the ink composition, and Y is the content of the phosphoric acid ester having $C_lH_{2l+1}O-C_2H_4O$ or $C_mH_{2m+1}O$ ($l, m = 1$ or more and $30$ or less) with respect to the total amount of the ink composition |  |  |  |  | 1.0 |  |
|  |  | C/D, wherein C is the content of the ketone resin with respect to the total amount of the ink composition, and D is the content of the polyvinyl butyral resin with respect to the total amount of the ink composition | 2.0 | 2.0 | 2.0 | 2.0 | 2.0 | 2.0 |
| Evaluation |  | Ink flow rate stability test | ○ | ○ | ○ | ○ | X | X |
|  |  | Writing test to check paper contact | ○ | ○ | ○ | ○ | X | X |
|  |  | Wear resistance test (abrasion test for ball socket) | X | X | X | X | ○ | X |
|  |  | Writing taste | X | X | X | X | ◎ | X |
|  |  | Start of writing performance test | Δ | Δ | Δ | Δ | ◎ | Δ |
|  |  | Ink aging test | ○ | ○ | ○ | ○ | ◎ | ○ | in the tables, (1) to (15) represent the following.
(1) Manufactured by Hodogaya Chemical Co., Ltd.
(2) Manufactured by Orient Chemical Industries, Co., Ltd.
(3) 16-methylstearic acid, manufactured by Nissan Chemical Industries, Ltd.
(4) Manufactured by Nissan Chemical Industries, Ltd.
(5) Oleic acid, manufactured by Kao Corporation
(6) Mixing ratio of the mixture of butoxyethyl acid phosphate monoester and butoxyethyl acid phosphate diester 4:6
(7) Phosphanol (HLB: 8.6, acid value: 85) manufactured by TOHO Chemical Industry Co., Ltd.
(8) Phosphanol (HLB: 10,5, acid value: 82) manufactured by TOHO Chemical Industry Co., Ltd.
(9) NYMEEN L201 (total amine value: 232 to 246) manufactured by NOF Corporation
(10) Manufactured by Sekisui Chemical Co., Ltd.
(11) UNISTER HR170R manufactured by NOF Corporation
(12) UNISTER H334R manufactured by NOF Corporation
(13) Manufactured by Hitachi Chemical Co., Ltd.
(14) PVP K-90, manufactured by ISP Japan Ltd.
(15) FARMIN DM2098 (total amine value: 254 to 265) manufactured by Kao Corporation The writing test with spiral drawings were carried out with the oil-based ballpoint pen, in which the ink consumption per initial 100 m in Examples 1, 2, 13, and 19 were 30 mg/100 m, 27 mg/100 m, 25 mg/100 m and 40 mg/100 m, respectively.

With respect to the ratio (ball diameter vs. ink consumption) of the ball diameter (mm) to the ink consumption (mg) per initial 100 m for the oil-based ballpoint pens of Examples 1, 2, 13 and 19, Example 1 had a ratio of 1:100, Example 2 had a ratio of 1:90, Example 13 had a ratio of 1:83, and Example 19 had a ratio of 1:80.

Note that, with respect to the ratios of EF in Example 1, Example 2, Example 13, and Example 19 when the ink consumption for the initial distance from 0 m tee 100 m was denoted by E mg and the ink consumption for 100 m at the end of the ink was denoted by F mg, Example 1 had a ratio of 30:33=1:1.1, Example 2 had a ratio of 27:25=1:0.93, Example 13 had a ratio of 25:27=1:1.08, and Example 19 had a ratio of 40:42=1:1.05.

Ink flow rate stability test: the writing test was conducted with a running tester at 4 m/min, a load of 100 gf and a writing angle of 70°, thereafter the writing was verified.

Dark writing with no influence of uneven wear of the sealing surface 14c of the second swaged portion 14b, the ink flow rate is stable, no decrease in ink outflow . . . ○

Writing with unstable ink flow rate and decrease in ink outflow due to the influence of uneven wear of the sealing surface 14c of the second swaged portion 14b . . . X Writing test to check paper contact: whether or not the outer surface of the second swaged portion 14b abutted on the paper surface was observed when writing by hand on the paper surface at a load of 100 gf and a writing angle of 70°.

Good writing without the outer surface of the second swaged portion 14b being caught on the paper surface . . . ○

Poor writing with the outer surface of the second swaged portion 14b being caught on the paper surface . . . X Wear resistance test (abrasion test for ball socket 19a): there was measured the wear of the ball socket 19a after the writing test with a running tester at 4 m/min, a load of 100 gf and a writing angle of 70°.

The wear of the ball socket 19a is less than 5 μm . . . ⊚
The wear of the ball socket 19a is in a range of 5 μm to 10 μm exclusive of 10 μm . . . ○
The wear of ball socket 19a is in a range of 10 μm to 20 μm exclusive of 20 μm, but writing can be done . . . Δ
The ball socket 19a is severe worn down and resulting in writing failure . . . X Writing taste: A sensory test by handwriting was conducted and evaluated.
Very smooth touch . . . ⊚
Smooth touch . . . ○
Smooth touch at a practically acceptable level . . . Δ
Heavy touch . . . X Start of writing performance test: After writing by hand, the tip distal end portion was exposed for 30 minutes in an environment of 20° C. and 65% RH, and then writing was performed with the running test at the following writing conditions, and the length of the blur in handwriting at the beginning of the writing was measured.

<Writing conditions> Linear drawings were performed with the running tester under the conditions of a writing load of 70 gf, a writing angle of 70°, and a writing speed of 4 m/min, and then the writing was evaluated.

The length of blur in handwriting was less than 10 mm . . . ⊚
The length of blur in handwriting was in a range of 10 mm to 20 mm exclusive of 20 mm . . . ○
The length of blur in handwriting was in a range of 20 mm to 40 mm exclusive of 40 mm . . . Δ
The length of blur in handwriting was 40 mm or more . . . X Ink aging test: The ink in the tip main body was observed with a microscope.
No precipitates, good . . . ⊚
Precipitates were slightly generated . . . ○
Precipitates were generated, but there was no problem in practical use . . . Δ
Precipitates were generated, which will cause blurring, writing failure, etc. . . . X Examples 1 to 31 had good performances in all of the wear resistance test (abrasion test for ball socket 19a), the writing taste, the start of writing performance test, and the ink aging test.

Examples 1 to 36 had better results in the ink flow rate stability test and the writing test to check paper contact than those in Comparative Examples 1 and 2. Specifically, in Comparative Example 1 and Comparative Example 2, the sealing surface 14c of the first swaged portion 14a was unevenly worn down, the ink flow rate was unstable, and decrease in ink outflow occurred. In Comparative Example 1 and Comparative Example 2, the second swaged portion 14b was caught on the paper while writing, with scratchy feeling of writing, and favorable writing was impossible. This is considered due to the fact that, in Comparative Example 1 and Comparative Example 2, the second inclination angle β and the angle γ are different from each other, and the second inclination angle β of 150 degrees is large.

Since the start of writing performance is one of important performances in a case of using retractable oil-based ballpoint pens such as click-type oil-based ballpoint pens and rotating retractable-type oil-based ballpoint pens, it is at least effective to use the oil-based ballpoint pen ink composition as in the present invention.

In the present examples, there is exemplified the ballpoint pen 1 in which the ballpoint pen refill 4 having ink reservoir cylinder containing the oil-based ballpoint pen ink composition is disposed in the barrel, but the ballpoint pen 1 of the present invention may be a direct fill-type ballpoint pen in which the barrel itself is an ink reservoir cylinder and the oil-based ballpoint pen ink composition is directly accommodated in the barrel, or may have a structure in which an article (ballpoint pen refill 4) accommodating the oil-based ballpoint pen ink composition in the ink reservoir cylinder 22 per se is used as the ballpoint pen 1.

INDUSTRIAL APPLICABILITY

The present invention can be used as a ballpoint pen, more specifically, the present invention can be widely used as a ballpoint pen such as a cap-type, a retractable-type ballpoint pen or the like.

The invention claimed is:

1. A ballpoint pen comprising a ballpoint pen refill, the ballpoint pen refill including an ink reservoir cylinder and a ballpoint pen tip, an inside of the ink reservoir cylinder being filled with an oil-based ballpoint pen ink composition, the ballpoint pen tip being attached to a distal end portion of the ink reservoir cylinder, wherein a tip main body of the ballpoint pen tip includes:
a ball holding chamber that holds a ball in a manner of allowing the ball to rotate while causing a part of the ball to protrude from a tip distal end portion;
a ball socket provided on a bottom wall of the ball holding chamber, the ball being placed on the ball socket, the ball socket having a circular-arc surface conforming to an outer shape of the ball;
an ink distribution hole formed in a center of the bottom wall of the ball holding chamber; and
a plurality of ink distribution channels radially extending from the ink distribution hole, the oil-based ballpoint pen ink composition has an ink viscosity with a range of 500 mPa·s to 15000 mPa·s inclusive at 20° C. and a shear rate of 500 sec$^{-1}$, the ball has a ball diameter of 0.5 mm or less,
a sealing surface with a circular-arc shape is formed on an inner wall of the tip distal end portion,
the tip distal end portion includes
a first swaged portion having an inclination angle with a range of 90 degrees to 100 degrees inclusive, and
a second swaged portion provided closer to a distal end side of the ballpoint pen tip than the first swaged portion, the second swaged portion having an inclination angle with a range of 110 degrees to 130 degrees inclusive, and
an angle of the bottom wall of the ball holding chamber is the same as the inclination angle of the second swaged portion.

2. The ballpoint pen according to claim 1, further comprising a coil spring that presses the ball toward the distal end side of the ball point pen tip, wherein a pressing load of the coil spring is in a range of 5 gf to 10 gf inclusive.

3. The ballpoint pen according to claim 1, wherein the oil-based ballpoint pen ink composition contains a colorant, an organic solvent, a saturated fatty acid, and a phosphoric acid ester, the phosphoric acid ester having $C_1H_{22H-1}O$—$C_2H_4O$ or $C_mH_{2m+1}O$ (1, m=1 to 30 inclusive).

4. The ballpoint pen according to claim 3, wherein the number of carbon atoms of the saturated fatty acid is in a range of 10 to 20 inclusive.

5. The ballpoint pen according to claim 3, wherein carbon chains (1, m) of a terminal alkyl group of the phosphoric acid ester are in a range of 1 to 15 inclusive.

6. The ballpoint pen according to claim 3, wherein the oil-based ballpoint pen ink composition contains a ketone resin or a polyvinyl butyral resin.

7. The ballpoint pen according to claim 3, wherein the colorant is a pigment or a salt-forming dye.

* * * * *